United States Patent
Oda

(10) Patent No.: US 10,914,254 B2
(45) Date of Patent: Feb. 9, 2021

(54) EXHAUST PURIFICATION SYSTEM OF INTERNAL COMBUSTION ENGINE AND EXHAUST PURIFICATION METHOD

(71) Applicant: TOYOTA JIDOSHA KABUSHIKI KAISHA, Toyota (JP)

(72) Inventor: Tomihisa Oda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/532,939

(22) Filed: Aug. 6, 2019

(65) Prior Publication Data

US 2020/0063680 A1   Feb. 27, 2020

(30) Foreign Application Priority Data

Aug. 24, 2018   (JP) ................................ 2018-157206

(51) Int. Cl.
*F02D 41/02* (2006.01)
*F02D 41/10* (2006.01)
(Continued)

(52) U.S. Cl.
CPC ..... *F02D 41/0235* (2013.01); *B01D 53/9481* (2013.01); *F01N 3/0814* (2013.01);
(Continued)

(58) Field of Classification Search
CPC ............ B01D 2258/01; B01D 53/9481; F01N 13/009; F01N 2430/06; F01N 2900/1602; F01N 2900/1614; F01N 3/0807; F01N 3/0814; F01N 3/0835; F01N 3/0842; F01N 9/00; F02D 41/0235; F02D 41/10
See application file for complete search history.

(56) References Cited

U.S. PATENT DOCUMENTS 5,884,473 A * 3/1999 Noda ....................... B01J 23/58
60/274
6,233,925 B1 * 5/2001 Hirota ................... F01N 3/0233
60/285

(Continued)

FOREIGN PATENT DOCUMENTS

DE   10 2004 012272 A1   9/2004
JP   2009-007946 A       1/2009
WO   00/27508 A1         5/2000

*Primary Examiner* — Jesse S Bogue
(74) *Attorney, Agent, or Firm* — Oliff PLC

(57) ABSTRACT

An exhaust purification system of an internal combustion engine 50 comprises: an adsorbent 20 adsorbing HC and NOx in exhaust gas, a catalyst 24 removing HC and NOx, an air-fuel ratio control part 31 configured to control an air-fuel ratio of exhaust gas discharged from an engine body of the internal combustion engine to the exhaust passage, and a temperature calculating part 32 configured to calculate a temperature of the adsorbent. At the adsorbent, a desorption temperature of HC is higher than a desorption temperature of NOx. The air-fuel ratio control part is configured to make the air-fuel ratio a stoichiometric air-fuel ratio when a temperature of the adsorbent is in the vicinity of the desorption temperature of NOx, then make the air-fuel ratio leaner than the stoichiometric air-fuel ratio when the temperature of the adsorbent reaches the vicinity of the desorption temperature of HC.

9 Claims, 13 Drawing Sheets

(51) Int. Cl.
   *F01N 3/08*   (2006.01)
   *B01D 53/94*   (2006.01)

(52) U.S. Cl.
   CPC .......... *F02D 41/10* (2013.01); *B01D 2258/01* (2013.01); *F01N 3/0835* (2013.01); *F01N 3/0842* (2013.01)

(56) References Cited

U.S. PATENT DOCUMENTS

| | | | | |
|---|---|---|---|---|
| 7,261,865 | B2* | 8/2007 | Bruck | F01N 3/2026 |
| | | | | 422/180 |
| 8,512,658 | B2* | 8/2013 | Eckhoff | B01D 53/9477 |
| | | | | 423/213.2 |
| 8,516,801 | B2* | 8/2013 | Sano | F01N 3/34 |
| | | | | 60/287 |
| 8,735,318 | B2* | 5/2014 | Nam | F01N 3/208 |
| | | | | 502/327 |
| 10,392,984 | B2* | 8/2019 | Nagaoka | F01N 3/103 |
| 10,618,003 | B2* | 4/2020 | Rajaram | B01J 37/0201 |
| 2005/0220679 | A1 | 10/2005 | Choi | |
| 2010/0058742 | A1* | 3/2010 | Hirata | B01J 23/58 |
| | | | | 60/286 |
| 2013/0312392 | A1* | 11/2013 | Henry | F01N 3/103 |
| | | | | 60/274 |
| 2015/0158023 | A1* | 6/2015 | Rajaram | B01J 37/0248 |
| | | | | 423/213.5 |

* cited by examiner

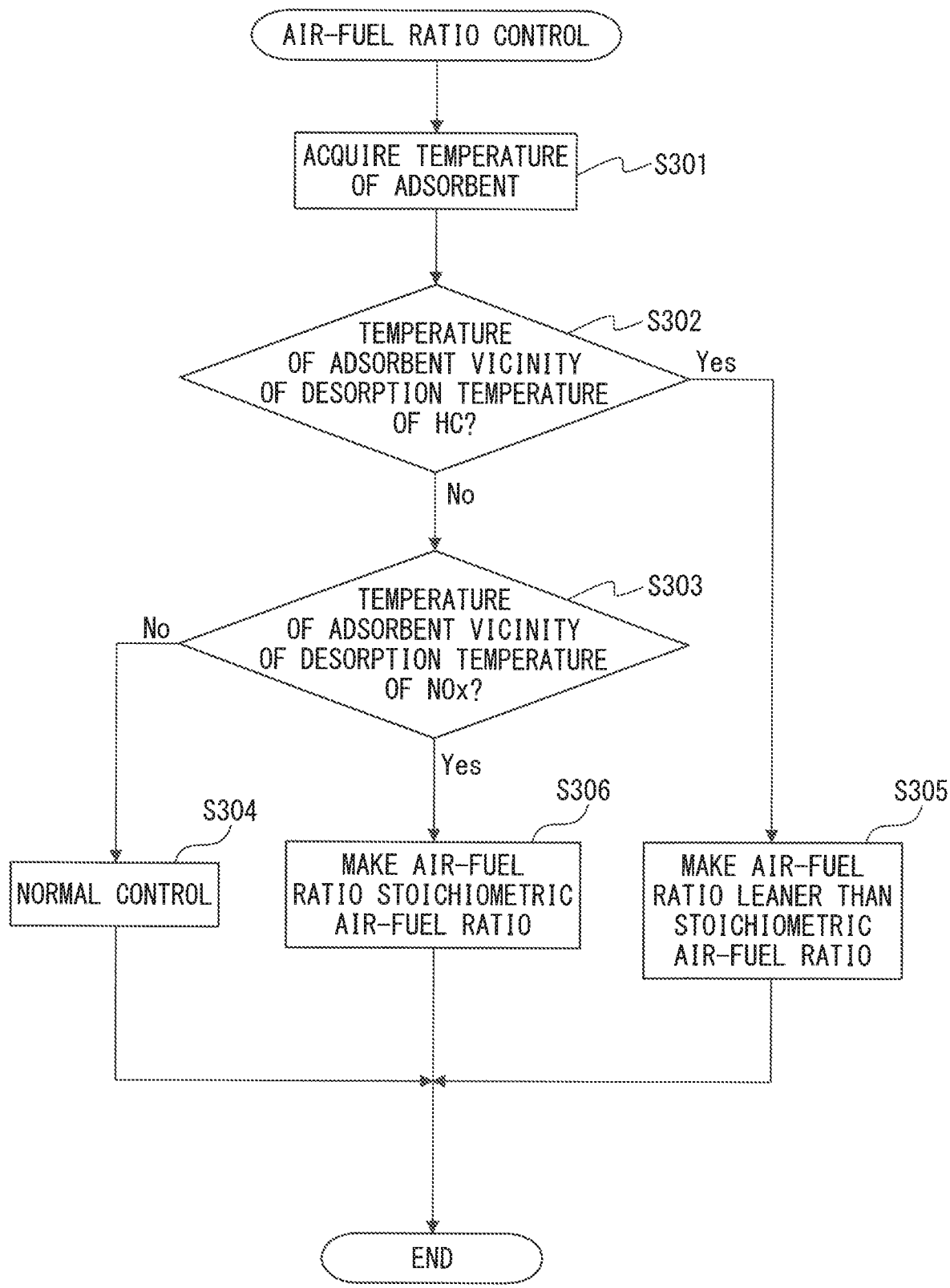

EXHAUST PURIFICATION SYSTEM OF INTERNAL COMBUSTION ENGINE AND EXHAUST PURIFICATION METHOD

FIELD

The present invention relates to an exhaust purification system of an internal combustion engine and exhaust purification method.

BACKGROUND

It has been known in the past to provide a catalyst for removing harmful substances in exhaust gas in an exhaust passage of an internal combustion engine so as to keep harmful substances from being discharged into the atmosphere. However, when the temperature of the exhaust gas is low such as at the time of cold start of the internal combustion engine, the catalyst becomes deactivated and the exhaust purification performance of the catalyst falls.

To deal with this, in the exhaust purification system of an internal combustion engine described in PTL 1, an adsorbent is placed in the exhaust passage of the internal combustion engine for adsorbing the HC and NOx in the exhaust gas when the catalyst is not activated. Further, in such an exhaust purification system, the adsorbent is configured so that the desorption timings of HC and NOx differ so that the HC and NOx desorbed from the adsorbent will not simultaneously flow into the catalyst.

CITATION LIST

Patent Literature

[PTL 1] Japanese Unexamined Patent Publication No. 2009-007946

SUMMARY

Technical Problem

However, HC and NOx differ in conditions for improving the performance in removal in a catalyst. For this reason, even if HC and NOx are desorbed at different timings, the HC and NOx are liable to not be suitably removed by the catalyst. For example, if NOx flows into the catalyst when setting the air-fuel ratio lean for effectively removing HC, the NOx will not be removed and will flow out from the catalyst.

Therefore, in view of the above technical problem, an object of the present invention is to keep the exhaust emissions from deteriorating when HC and NOx flow out from an adsorbent arranged in an exhaust passage of an internal combustion engine.

Solution to Problem

The summary of the present disclosure is as follows.

(1) An exhaust purification system of an internal combustion engine comprising an adsorbent arranged in an exhaust passage of an internal combustion engine and adsorbing HC and NOx in exhaust gas, a catalyst arranged in the exhaust passage at a downstream side from the adsorbent in a direction of exhaust flow and removing HC and NOx, an air-fuel ratio control part configured to control an air-fuel ratio of exhaust gas discharged from an engine body of the internal combustion engine to the exhaust passage, and a temperature calculating part configured to calculate a temperature of the adsorbent, wherein at the adsorbent, a desorption temperature of HC is higher than a desorption temperature of NOx, and the air-fuel ratio control part is configured to make the air-fuel ratio a stoichiometric air-fuel ratio when a temperature of the adsorbent is in the vicinity of the desorption temperature of NOx, then make the air-fuel ratio leaner than the stoichiometric air-fuel ratio when the temperature of the adsorbent reaches the vicinity of the desorption temperature of HC.

(2) An exhaust purification system of an internal combustion engine comprising an adsorbent arranged in an exhaust passage of an internal combustion engine and adsorbing HC and NOx in exhaust gas, a catalyst arranged in the exhaust passage at a downstream side from the adsorbent in a direction of exhaust flow and removing HC and NOx, an air-fuel ratio control part configured to control an air-fuel ratio of exhaust gas discharged from an engine body of the internal combustion engine to the exhaust passage, and a temperature calculating part configured to calculate a temperature of the adsorbent, wherein at the adsorbent, a desorption temperature of NOx is higher than a desorption temperature of HC, and the air-fuel ratio control part is configured to make the air-fuel ratio leaner than a stoichiometric air-fuel ratio when a temperature of the adsorbent is in lire vicinity of the desorption temperature of HC, then make the air-fuel ratio the stoichiometric air-fuel ratio when the temperature of the adsorbent reaches the vicinity of the desorption temperature of NOx.

(3) The exhaust purification system of an internal combustion engine described in above (1) or (2), wherein the air-fuel ratio control part is configured to make the air-fuel ratio leaner than the stoichiometric air-fuel ratio by performing fuel cut control in which feed of fuel to a combustion chamber of the internal combustion engine is stopped.

(4) The exhaust purification system of an internal combustion engine described in any one of above (1) to (3), wherein a vehicle in which the internal combustion engine is provided is a hybrid vehicle, the exhaust purification system of an internal combustion engine further comprises a motor able to start operation of the internal combustion engine, and the air-fuel ratio control part is configured to make the air-fuel ratio leaner than the stoichiometric air-fuel ratio by using the motor to start operation of the internal combustion engine.

(5) The exhaust purification system of an internal combustion engine described in any one of above (1) to (4), further comprising an adsorbent heating device heating the adsorbent and an adsorbent heating part configured to control the adsorbent heating device, wherein the adsorbent heating part is configured to maintain the temperature of the adsorbent in a vicinity of the desorption temperature of HC by the adsorbent heating device when the air-fuel ratio control part makes the air-fuel ratio leaner than the stoichiometric air-fuel ratio.

(6) The exhaust purification system of an internal combustion engine described in any one of above (1) to (5), wherein a vehicle in which the internal combustion engine is provided is a hybrid vehicle, the exhaust purification system of an internal combustion engine further comprises a load control part configured to control a load of the internal combustion engine, and the load control part is configured to control the load so that the temperature of the adsorbent is maintained in the vicinity of the desorption temperature of NOx when the air-fuel ratio control part makes the air-fuel ratio the stoichiometric air-fuel ratio.

(7) The exhaust purification system of an internal combustion engine described in any one of above (1) to (6), further comprising an adsorbent heating device heating the adsorbent and an adsorbent heating part configured to control the adsorbent heating device, wherein the adsorbent heating part is configured to maintain the temperature of the adsorbent in the vicinity of the desorption temperature of NOx by the adsorbent heating device when the air-fuel ratio control part makes the air-fuel ratio the stoichiometric air-fuel ratio.

(8) The exhaust purification system of an internal combustion engine described in any one of above (1) to (7), further comprising a catalyst heating device heating the catalyst and a catalyst heating part configured to control the catalyst heating device, wherein the catalyst heating part is configured to maintain a temperature of the catalyst at an activation temperature or more by the catalyst heating device when the temperature of the adsorbent is in the vicinity of the desorption temperature of NOx and when the temperature of the adsorbent is in the vicinity of the desorption temperature of HC.

(9) An exhaust purification method using an adsorbent arranged in an exhaust passage of an internal combustion engine and adsorbing HC and NOx in exhaust gas, and a catalyst arranged in the exhaust passage at a downstream side from the adsorbent in a direction of exhaust flow and removing HC and NOx, comprising making an air-fuel ratio of exhaust gas discharged from an engine body of the internal combustion engine to the exhaust passage a stoichiometric air-fuel ratio when a temperature of the adsorbent is the vicinity of a desorption temperature of NOx, and making the air-fuel ratio leaner than the stoichiometric air-fuel ratio when the temperature of the adsorbent reaches the vicinity of a desorption temperature of HC, wherein at the adsorbent, the desorption temperature of HC is higher than the desorption temperature of NOx.

(10) An exhaust purification method using an adsorbent arranged in an exhaust passage of an internal combustion engine and adsorbing HC and NOx in exhaust gas and a catalyst arranged in the exhaust passage at a downstream side from the adsorbent in a direction of exhaust flow and removing HC and NOx, comprising making an air-fuel ratio of exhaust gas discharged from an engine body of the internal combustion engine to the exhaust passage leaner than a stoichiometric air-fuel ratio when a temperature of the adsorbent is the vicinity of a desorption temperature of HC, and making the air-fuel ratio the stoichiometric air-fuel ratio when the temperature of the adsorbent reaches the vicinity of a desorption temperature of NOx, wherein at the adsorbent, the desorption temperature of NOx is higher than the desorption temperature of HC.

Advantageous Effects of Invention

According to the present invention, it is possible to keep the exhaust emissions from deteriorating when HC and NOx flow out from an adsorbent arranged in an exhaust passage of an internal combustion engine.

BRIEF DESCRIPTION OF DRAWINGS

FIG. 13 is a flow chart showing a control routine of air-fuel ratio control in the fourth embodiment.

DESCRIPTION OF EMBODIMENTS

Figure 1:
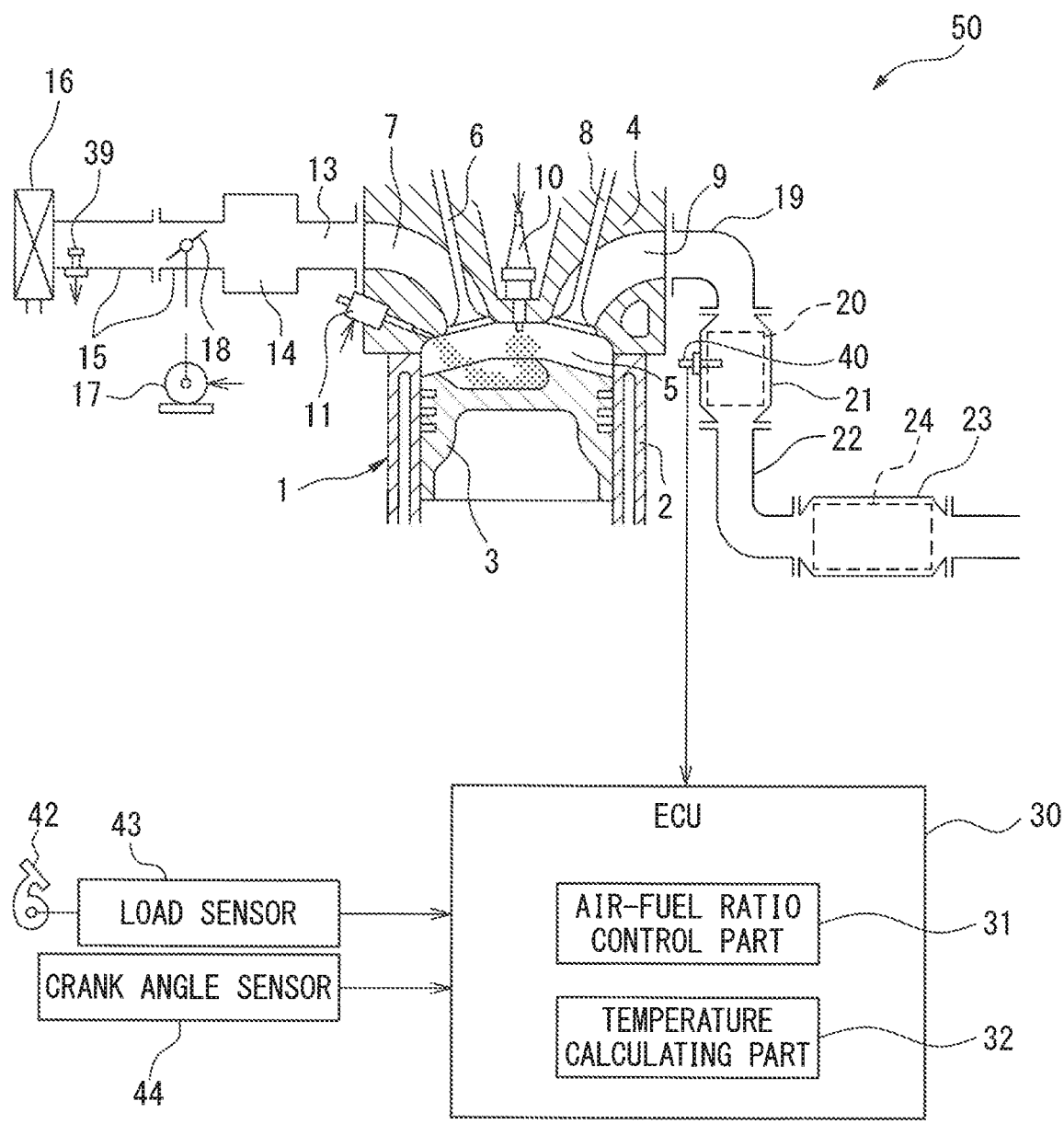
FIG. 1 is a view schematically showing an internal combustion engine in which an exhaust purification system of an internal combustion engine according to a first embodiment of the present invention is used.

Below, referring to the drawings, the exhaust purification system of an internal combustion engine and exhaust purification method in embodiments of the present invention will be explained in detail. Note that, in the following explanation, similar component elements are assigned the same reference notations.

First Embodiment

First, referring to FIG. 1 to FIG. 5, a first embodiment of the present invention will be explained.

Explanation of Internal Combustion Engine as a Whole

FIG. 1 is a view schematically showing an internal combustion engine 50 in which an exhaust purification system of an internal combustion engine according to a first embodiment of the present invention is used. The internal combustion engine 50 shown in FIG. 1 is a spark ignition type internal combustion engine (for example a gasoline engine). The internal combustion engine 50 is mounted in a vehicle.

The internal combustion engine 50 is provided with an engine body 1 including a cylinder block 2 and a cylinder head 4 fixed on the cylinder block 2. Inside the cylinder block 2, a piston 3 is arranged reciprocating inside each cylinder formed in the cylinder block 2. Between the piston 3 and the cylinder head 4, a combustion chamber 5 is formed in which an air-fuel mixture is burned.

The cylinder head 4 is formed with an intake port 7 and exhaust port 9. The intake port 7 and exhaust port 9 communicate with the combustion chamber 5. Further, the internal combustion engine is provided with an intake valve 6 and exhaust valve 8 arranged inside the cylinder head 4. The intake valve 6 opens and closes the intake port 7 while the exhaust valve 8 opens and closes the exhaust port 9.

Further, the internal combustion engine 50 is provided with a spark plug 10 arranged at the center part of the inside wall surface of the cylinder head 4 and a fuel injector 11 arranged at a peripheral part of the inside wall surface of the cylinder head 4. The spark plug 10 is configured so as to generate a spark in response to an ignition signal. Further, the fuel injector 11 injects a predetermined amount of fuel into the combustion chamber 5 in response to an injection signal. In the present embodiment, as fuel, gasoline with a stoichiometric air-fuel ratio of 14.6 is used.

Further, the internal combustion engine 50 is provided with an intake runner 13, surge lank 14, intake pipe 15, air cleaner 16, and throttle valve 18. The intake port 7 of each cylinder is connected to the surge tank 14 through a corresponding intake runner 13, while the surge tank 14 is connected through the intake pipe 15 to the air cleaner 16. The intake port 7, intake runner 13, surge tank 14, intake pipe 15, etc., form an intake passage guiding air to the combustion chamber 5. The throttle valve 18 is arranged between the surge tank 14 and air cleaner 16 in the intake pipe 15 and is driven by a throttle valve driving actuator 17. The throttle valve 18 can change the open area of the intake passage by being made to turn by the throttle valve driving actuator 17.

Further, the internal combustion engine 50 is provided with an exhaust manifold 19, exhaust pipe 22, adsorbent 20, and catalyst 24. The exhaust port 9 of each cylinder is connected to the exhaust manifold 19. The exhaust manifold 19 has a plurality of runners connected to the exhaust ports 9 and a header to which these runners are joined. The header of the exhaust manifold 19 is connected to an upstream side casing 21 housing the adsorbent 20. The upstream side casing 21 is connected through the exhaust pipe 22 to a downstream side casing 23 housing a catalyst 24. The exhaust port 9, exhaust manifold 19, upstream side casing 21, exhaust pipe 22, downstream side casing 23, etc., form an exhaust passage discharging exhaust gas generated by combustion of the air-fuel mixture in the combustion chamber 5.

The various control operations of the internal combustion engine 50 are performed by an electronic control unit (ECU) 30. The ECU 30 is a digital computer including a central processing unit (CPU), a memory such as a ROM and RAM, an input port, an output port, etc. The ECU 30 controls various types of actuators of the internal combustion engine 50 based on the outputs etc., of the various sensors of the internal combustion engine 50.

At the intake pipe 15, an air flow meter 39 is arranged for detecting the amount of flow of air through the inside of the intake pipe 15. The air flow meter 39 is electrically connected to the ECU 30. The output of the air flow meter 39 is input to the ECU 30. Further, at the adsorbent 20, an adsorbent temperature sensor 40 is arranged for detecting the temperature of the adsorbent 20. The adsorbent temperature sensor 40 is electrically connected to the ECU 30. The output of the adsorbent temperature sensor 40 is input to the ECU 30.

Further, at the accelerator pedal 42, a load sensor 43 is connected for generating an output voltage proportional to the amount of depression of the accelerator pedal 42. The load sensor 43 is electrically connected to the ECU 30. The output of the load sensor 43 is input to the ECU 30. The ECU 30 calculates the engine lord based on the output of the load sensor 43.

Further, the internal combustion engine 50 is provided with a crank angle sensor 44. The crank angle sensor 44 for example generates an output pulse every time the crankshaft rotates by 15 degrees. The crank angle sensor 44 is electrically connected to the ECU 30. The output of the crank angle sensor 44 is input to the ECU 30. The ECU 30 calculates the engine speed based on the output of the crank angle sensor 44.

Further, the ECU 30 is electrically connected to the spark plug 10, the fuel injector 11, and the throttle valve drive actuator 17 and controls the same. Specifically, the ECU 30 controls the ignition timing of the spark plug 10, the injection timing and injection amount of the fuel injector 11, and the opening degree of the throttle valve 18.

Note that, the above-mentioned internal combustion engine is a nonsupercharging internal combustion engine using gasoline as fuel, but the configuration of the internal combustion engine is not limited to the above configuration. Therefore, the specific configuration of the internal combustion engine such as the cylinder array, mode of injection of fuel, configuration of intake and exhaust systems, configuration of valve operating mechanisms, and presence or absence of a supercharger may differ from the configuration shown in FIG. 1. For example, the fuel injector 11 may be arranged so as to inject fuel inside the intake port 7.

Exhaust Purification System of Internal Combustion Engine

Below, an exhaust purification system of an internal combustion engine (below, simply referred to as an "exhaust purification system") according to a first embodiment of the present invention will be explained.

The exhaust purification system is provided with an adsorbent 20 and catalyst 24. The adsorbent 20 is arranged in the exhaust passage and adsorbs the HC (hydrocarbons) and NOx (nitrogen oxides) in the exhaust gas flowing through the exhaust passage. For example, the adsorbent 20 is a honeycomb adsorbent member comprised of a honeycomb carrier on the cell walls of which an adsorbent layer is formed.

The adsorbent 20 adsorbs HC and NOx and keeps the HC and NOx from flowing into the catalyst 24 when the temperature of the exhaust gas is low like at the time of cold start of the internal combustion engine 50. For this reason, by using the adsorbent 20 to adsorb HC and NOx, it is possible to keep the exhaust emissions from deteriorating when the temperature of the exhaust gas is low.

Specifically, when the temperature of the adsorbent 20 is less than the desorption temperature of HC, the adsorbent 20 adsorbs the HC in the exhaust gas flowing into the adsorbent 20. On the other hand, when the temperature of the adsorbent 20 is equal to or more than the desorption temperature of HC, the adsorbent 20 makes the HC adsorbed at the adsorbent 20 desorb. Note that, the "desorption temperature of HC" is the temperature when the desorption speed of HC becomes equal to or more than a predetermined value.

Further, when the temperature of the adsorbent 20 is less than the desorption temperature of NOx, the adsorbent 20 adsorbs the NOx in the exhaust gas flowing into the adsorbent 20. On the other hand, when the temperature of the adsorbent 20 is equal to or more than the desorption temperature of NOx, the adsorbent 20 makes the NOx adsorbed at the adsorbent 20 desorb. Note that, the "desorption temperature of NOx" is the temperature when the desorption speed of NOx becomes equal to or more than a predetermined value. Note that, the desorption temperature of HC and the desorption temperature of NOx are acquired by experiments in advance.

The catalyst 24 is arranged in the exhaust passage at the downstream side from the adsorbent 20 in the direction of exhaust flow and removes HC and NOx. The catalyst 24 is for example a three-way catalyst. Specifically, the catalyst 24 is comprised of a support made of a ceramic at which a precious metal having a catalytic action (for example, platinum (Pt)) and a promoter having an oxygen storing ability (for example, ceria ($CeO_2$)) are supported.

Figure 2:
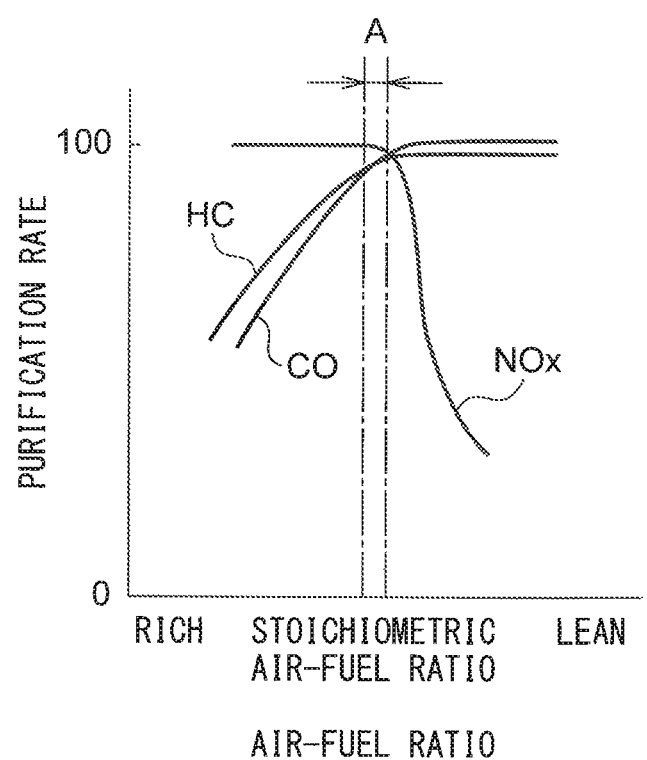
FIG. 2 shows the purification characteristics of a three-way catalyst.

FIG. 2 shows the purification characteristics of a three-way catalyst. As shown in FIG. 2, the purification rates of unburned gases (HC, CO) and NOx by the catalyst 24 become relatively high when the air-fuel ratio of the exhaust gas flowing into the catalyst 24 is in the region in the vicinity of the stoichiometric air-fuel ratio (purification window A in FIG. 2).

Further, the catalyst 24 stores or releases oxygen by the promoter in accordance with the air-fuel ratio of the exhaust gas. Specifically, the catalyst 24 stores excessive oxygen in the exhaust gas when the air-fuel ratio of the exhaust gas is leaner than the stoichiometric air-fuel ratio. On the other hand, the catalyst 24 releases an amount of oxygen corresponding to the amount insufficient for oxidizing the unburned gases when the air-fuel ratio of the exhaust gas is richer than the stoichiometric air-fuel ratio. As a result, even if the air-fuel ratio of the exhaust gas deviates somewhat from the stoichiometric air-fuel ratio, the air-fuel ratio on the surface of the catalyst 24 is maintained in the vicinity of the stoichiometric air-fuel ratio and the unburned gases and NOx in the catalyst 24 are effectively removed.

Further, the exhaust purification system is presided with an air-fuel ratio control part 31 and a temperature calculating part 32. In the present embodiment, the ECU 30 functions as the air-fuel ratio control part 31 and the temperature calculating part 32.

The air-fuel ratio control part 31 controls the air-fuel ratio of the exhaust gas discharged from the engine body 1 of the internal combustion engine 50, i.e., the air-fuel ratio of the exhaust gas at the upstream side from the adsorbent 20 in the direction of exhaust flow. Specifically, the air-fuel ratio control part 31 controls the fuel injection amount of the fuel injector 11 to thereby control the air-fuel ratio of the exhaust gas. The fuel injection amount FA is calculated by the following formula (1) based on the target air-fuel ratio TAF and the intake air amount IA. The intake air amount IA is detected by the air flow meter 39.

$$FA = IA/TAF \quad (1)$$

Note that, the air-fuel ratio control part 31 may control by feedback the fuel injection amount of the fuel injector 11 based on the output of an air-fuel ratio sensor arranged at the upstream side from the adsorbent 20 in the direction of exhaust flow in the exhaust passage. In this case, the air-fuel ratio control part 31 controls the fuel injection amount of the fuel injector 11 so that the air-fuel ratio detected by the air-fuel ratio sensor becomes the target air-fuel ratio.

The temperature calculating part 32 calculates the temperature of the adsorbent 20. For example, the temperature calculating part 32 calculates the temperature of the adsorbent 20 based on the output of the adsorbent temperature sensor 40. In this case, the temperature of the adsorbent 20 is detected by the adsorbent temperature sensor 40. Note that, the adsorbent temperature sensor 40 may be arranged at the upstream side from the adsorbent 20 in the direction of exhaust flow in the exhaust passage and detect the temperature of the exhaust gas flowing into the adsorbent 20. Further, the temperature calculating part 32 may calculate the temperature of the adsorbent 20 based on the operating state of the internal combustion engine 50 (the amount of intake air etc.). In this case, the adsorbent temperature sensor 40 may be omitted.

As explained above, when the temperature of the adsorbent 20 is equal to or more than the desorption temperature of HC, the HC adsorbed at the adsorbent 20 is desorbed. On the other hand, when the temperature of tire adsorbent 20 is equal to or more than the desorption temperature of NOx, the NOx adsorbed at the adsorbent 20 is desorbed. The HC and NOx desorbed from the adsorbent 20 flow into the catalyst 24 together with the exhaust gas.

In this regard, HC and NOx differ in conditions for improving the performance for removal at the catalyst 24. Specifically, if HC is desorbed from the adsorbent 20, it is possible to make the air-fuel ratio of the exhaust gas leaner than the stoichiometric air-fuel ratio and supply oxygen in the exhaust gas to the catalyst 24 together with the HC to effectively remove HC at the catalyst 24. On the other hand, if NOx is desorbed from the adsorbent 20, it is possible to make the air-fuel ratio of the exhaust gas Ac stoichiometric air-fuel ratio to keep HC from being produced while effectively removing NOx at the catalyst 24.

For this reason, to keep the exhaust emissions from deteriorating, it is desirable to suitably control the air-fuel ratio of the exhaust gas in accordance with the type of substance desorbed from the adsorbent 20. In the present embodiment, at the adsorbent 20, the desorption temperature of HC is higher than the desorption temperature of NOx. In other words, the adsorbent 20 is configured so that the desorption temperature of HC becomes higher than the desorption temperature of NOx.

For this reason, when the internal combustion engine 50 is warmed up and the temperature of the exhaust gas rises, NOx is desorbed from the adsorbent 20 in advance of the HC, then HC is desorbed from the adsorbent 20. NOx and HC differ in suitable removal conditions, so it is desirable to remove NOx before HC is desorbed and then remove the HC.

Therefore, in the present embodiment, the air-fuel ratio control part 31 makes the air-fuel ratio the stoichiometric air-fuel ratio (in the present embodiment, 14.6) when the temperature of the adsorbent 20 is in the vicinity of the desorption temperature of NOx, then makes the air-fuel ratio leaner than the stoichiometric air-fuel ratio when the temperature of the adsorbent 20 reaches the vicinity of the desorption temperature of HC. By doing this, the HC and NOx desorbed from the adsorbent 20 are effectively removed at suitable timings, so it is possible to keep the exhaust emissions from deteriorating when HC and NOx flow out from the adsorbent 20.

Explanation of Control Using Time Chart

Figure 3:
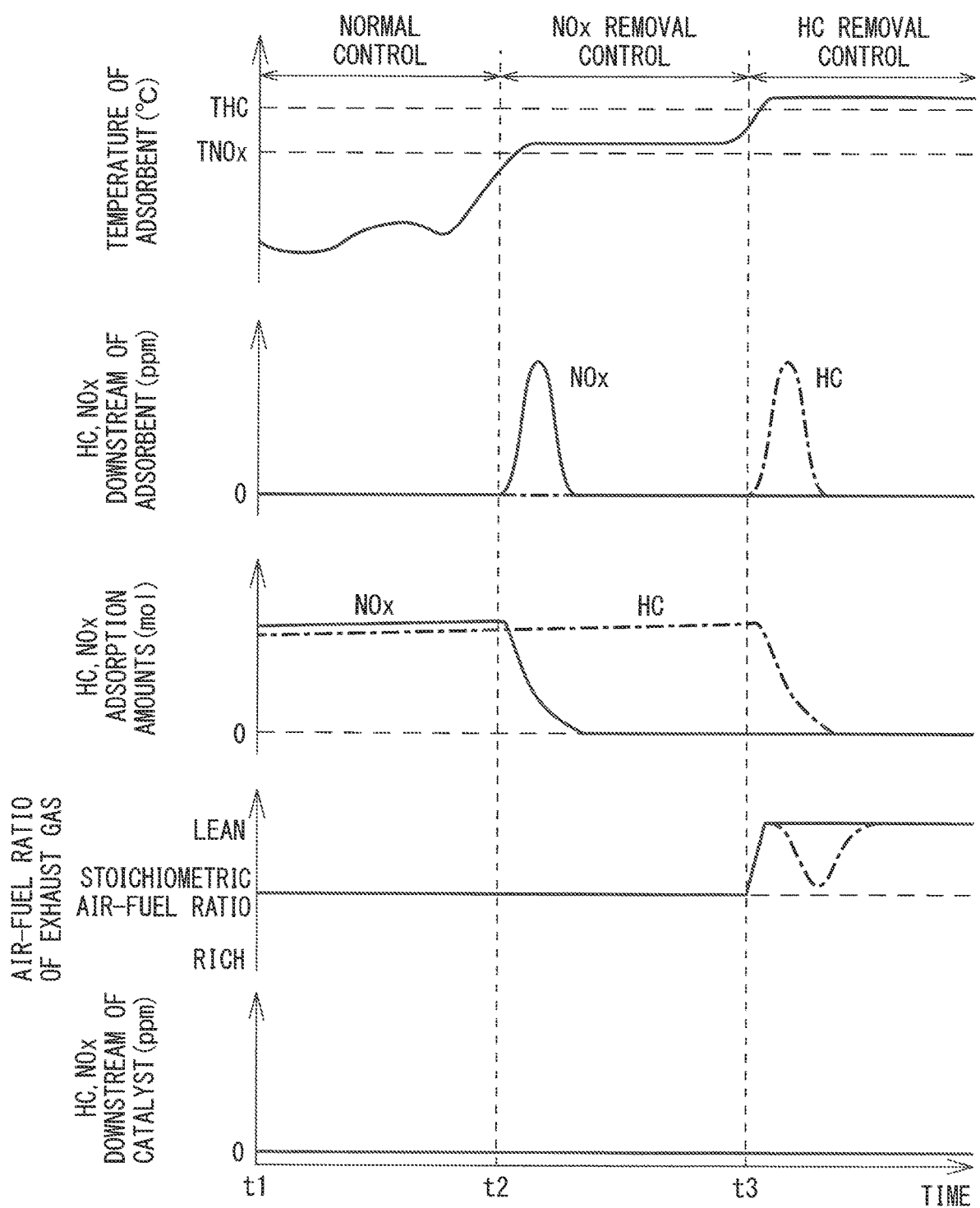
FIG. 3 is a time chart of the HC and NOx concentrations etc., in exhaust gas downstream of a catalyst when control in the first embodiment is performed.

Below, referring to FIG. 3, the control in the present embodiment for removing HC and NOx desorbed from the adsorbent 20 will be specifically explained. FIG. 3 is a time chart of the HC and NOx concentrations in the exhaust gas downstream of the catalyst, the air-fuel ratio of the exhaust gas, the amount of adsorptions of HC and NOx at the adsorbent, the HC and NOx concentrations in the exhaust gas downstream of the adsorbent, and the temperature of the adsorbent when control in the first embodiment is performed.

In the graph of the HC and NOx concentrations in the exhaust gas downstream of the catalyst 24, the NOx concentration is shown by the solid line, while the HC concentration is shown by the one-dot chain line. In the graph of the air-fuel ratio of the exhaust gas, the air-fuel ratio of the exhaust gas at the upstream side from the adsorbent 20 in the direction of exhaust flow (below, referred to as the "engine exhaust air-fuel ratio") is shown by the solid line, while the air-fuel ratio of the exhaust gas at the catalyst 24 (below, referred to as the "catalyst air-fuel ratio") is shown by the one-dot chain line. In the graph of the amounts of adsorption of NOx and HC at the adsorbent 20, the amount of adsorption of NOx is shown by the solid line, while the amount of adsorption of HC is shown by the one-dot chain line. In the graph of the HC and NOx concentrations in the exhaust gas downstream of the adsorbent 20, the NOx concentration is shown by the solid line, while the HC concentration is shown by the one-dot chain line.

In the illustrated example, at the time t1, predetermined values or more of NOx and HC are adsorbed at the adsorbent 20. Further, at the time t1, the temperature of the adsorbent 20 is less than the desorption temperature TNOx of NOx, and NOx and HC are not desorbed from the adsorbent 20.

In the example of FIG. 3, in normal control where HC and NOx desorbed from the adsorbent 20 are not removed, the target air-fuel ratio of the exhaust gas is set to the stoichiometric air-fuel ratio. For this reason, at the time t1, the engine exhaust air-fuel ratio and catalyst air-fuel ratio are maintained at the stoichiometric air-fuel ratio. Note that, even if the target air-fuel ratio of the exhaust gas is set to the stoichiometric air-fuel ratio, due to fluctuations in the engine load etc., the air-fuel ratio of the exhaust gas will temporarily deviate from the stoichiometric air-fuel ratio and HC and NOx will flow out to the exhaust passage. For this reason, if normal control is continued when the temperature of the adsorbent 20 is low, the amounts of adsorption of HC and NOx at the adsorbent 20 will gradually increase.

After the time t1, the temperature of the adsorbent 20 gradually rises. At the time t2, it reaches the vicinity of the desorption temperature TNOx of NOx. For this reason, at the time t2, the target air-fuel ratio of the exhaust gas is set to the stoichiometric air-fuel ratio and NOx removal control is started. Note that, in the example of FIG. 3, the target air-fuel ratio in normal control is also the stoichiometric air-fuel ratio, so the target air-fuel ratio is maintained at the stoichiometric air-fuel ratio.

After time time t2, due to desorption of NOx from the adsorbent 20, the NOx concentration in the exhaust gas downstream of the adsorbent 20 becomes higher and the amount of adsorption of NOx at the adsorbent 20 gradually decreases. At this time, the engine exhaust air-fuel ratio and catalyst air-fuel ratio are maintained at the stoichiometric air-fuel ratio, so NOx is removed at the catalyst 24 and does not flow out from the catalyst 24 much at all.

In the example of FIG. 3, after the time t2, at the time t3, the temperature of the adsorbent 20 reaches the vicinity of the desorption temperature THC of HC. For this reason, at the time t3, the target air-fuel ratio of the exhaust gas is set to leaner than the stoichiometric air-fuel ratio and HC removal control is started.

After the time t3, due to desorption of HC from the adsorbent 20, the HC concentration in the exhaust gas downstream of the adsorbent 20 becomes higher and the amount of adsorption of HC at the adsorbent 20 gradually decreases. At this time, the engine exhaust air-fuel ratio and catalyst air-fuel ratio are maintained leaner than the stoichiometric air-fuel ratio. The HC desorbed from the adsorbent 20 reacts with the oxygen in the exhaust gas. For this reason, the HC is removed at the catalyst 24 and does not flow out from the catalyst 24 much at all.

Note that, in the example of FIG. 3, the NOx removal control and the HC removal control are consecutively performed, but normal control may be performed between the NOx removal control and HC removal control.

Figure 4:
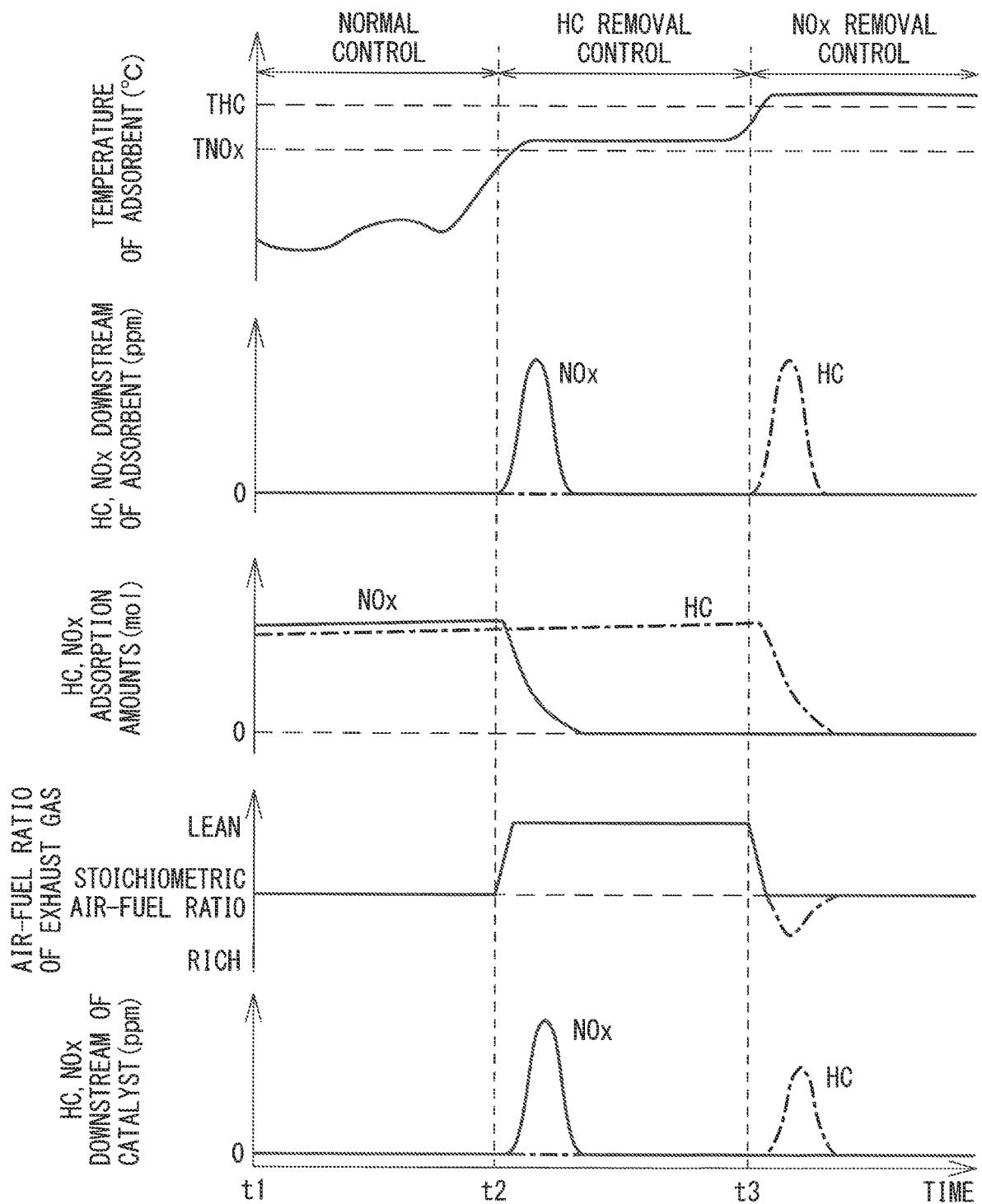
FIG. 4 is a time chart of the HC and NOx concentrations etc., in exhaust gas downstream of a catalyst when control in a comparative example is performed.

FIG. 4 is a time chart similar to FIG. 3 when control in a comparative example is performed. In the comparative example, the order of the NOx removal control and HC removal control is reverse from the present embodiment. That is, HC removal control is performed when the temperature of the adsorbent 20 is in the vicinity of the desorption temperature TNOx of NOx, while NOx removal control is performed when the temperature of the adsorbent 20 is in the vicinity of the desorption temperature THC of HC.

For this reason, after the time t2, the target air-fuel ratio of the exhaust gas is set to leaner than the stoichiometric air-fuel ratio, and the engine exhaust air-fuel ratio and catalyst air-fuel ratio are maintained leaner than the stoichiometric air-fuel ratio. As a result, the NOx desorbed from the adsorbent 20 flows out from the catalyst 24 without being removed at the catalyst 24.

Further, after the time t3, the target air-fuel ratio of the exhaust gas is set to the stoichiometric air-fuel ratio, and the engine exhaust air-fuel ratio is maintained at the stoichiometric air-fuel ratio. On the other hand, due to the effect of the HC desorbed from the adsorbent 20, the catalyst air-fuel ratio becomes richer than the stoichiometric air-fuel ratio. As a result, the performance of the catalyst 24 in removing HC falls, and a part of the HC desorbed from the adsorbent 20 flows out from the catalyst 24 without being removed at the catalyst 24.

Therefore, in the present embodiment if the desorption temperature THC of HC is higher than the desorption temperature TNOx of NOx, it is possible to perform the NOx removal control and HC removal control at suitable timings to thereby decrease the amounts of outflow of NOx and HC compared with the comparative example.

Air-Fuel Ratio Control

Figure 5:
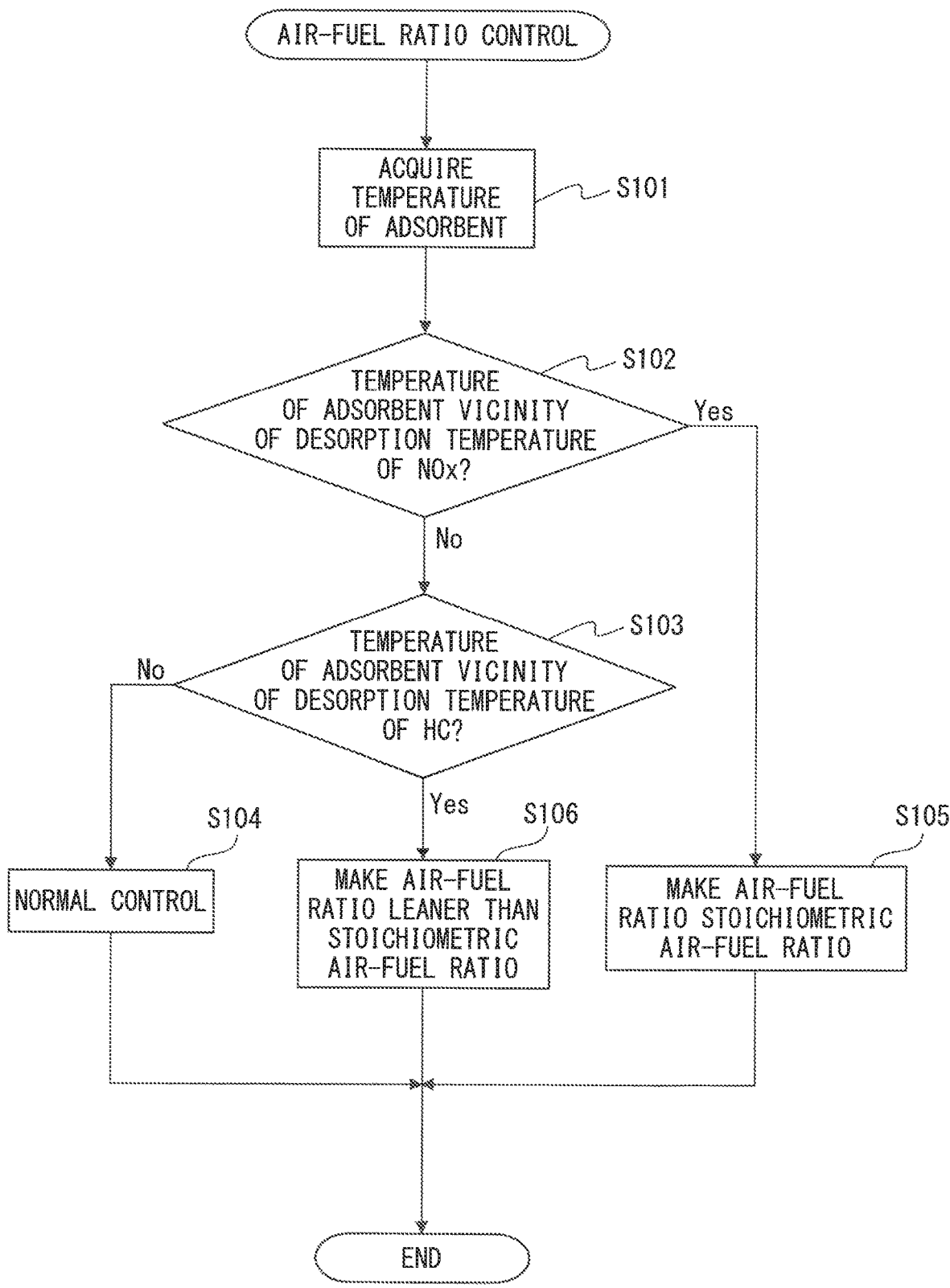
FIG. 5 is a flow chart showing a control routine of air-fuel ratio control in the first embodiment.

Below, referring to the flow chart of FIG. 5, the air-fuel ratio control for removing HC and NOx in the present embodiment will be explained. FIG. 5 is a flow chart showing the control routine of air-fuel ratio control in the first embodiment. The present control routine is repeatedly performed by the ECU 30 at predetermined intervals.

First, at step S101, the air-fuel ratio control part 31 acquires the temperature of the adsorbent 20. The temperature of the adsorbent 20 is calculated by the temperature calculating part 32.

Next, at step S102, the air-fuel ratio control part 31 judges whether the temperature of the adsorbent 20 is in the vicinity of the desorption temperature of NOx. The "vicinity of the desorption temperature of NOx" is predetermined and for example is set to a temperature region where the difference from the desorption temperature of NOx is within a predetermined value. Further, the "vicinity of the desorption temperature of NOx" may be set to a temperature region between the desorption temperature of NOx and a predetermined temperature higher than the desorption temperature of NOx.

If at step S102 it is judged that the temperature of the adsorbent 20 is not in the vicinity of the desorption temperature of NOx, the present control routine proceeds to step S103. At step S103, the air-fuel ratio control part 31 judges whether the temperature of the adsorbent 20 is in the vicinity of the desorption temperature of HC. The "vicinity of the desorption temperature of HC" is predetermined and is higher than the vicinity of the desorption temperature of NOx. For example, the "vicinity of the desorption temperature of HC" is set to a temperature region where the difference from the desorption temperature of HC is within a predetermined value. Further, the "vicinity of the desorption temperature of HC" may be set to a temperature region between the desorption temperature of HC and a predetermined temperature higher than the desorption temperature of HC.

If at step S103 it is judged that the temperature of the adsorbent 20 is not in the vicinity of the desorption temperature of HC, the present control routine proceeds to step S104. At step S104, the air-fuel ratio control part 31 performs normal control. Specifically, the air-fuel ratio control part 31 controls the air-fuel ratio of the exhaust gas to a predetermined air-fuel ratio (for example, the stoichiometric air-fuel ratio) in accordance with the operating state of the internal combustion engine 50. That is, the air-fuel ratio control part 31 controls the target air-fuel ratio of the exhaust gas to a predetermined air-fuel ratio in accordance with the operating state of the internal combustion engine 50. After step S104, the present control routine ends.

On the other hand, if at step S102 it is judged that the temperature of the adsorbent 20 is in the vicinity of the desorption temperature of NOx, the present control routine proceeds to step S105. At step S105, the air-fuel ratio control part 31 performs NOx removal control. Specifically, the air-fuel ratio control part 31 makes the air-fuel ratio of the exhaust gas the stoichiometric air-fuel ratio. That is, the air-fuel ratio control part 31 sets the target air-fuel ratio of the exhaust gas to the stoichiometric air-fuel ratio. After step S105, the present control routine ends.

Further, if at step S103 it is judged that the temperature of the adsorbent 20 is in the vicinity of the desorption temperature of HC, the present control routine proceeds to step S106. At step S106, the air-fuel ratio control part 31 performs HC removal control. Specifically, the air-fuel ratio control part 31 makes the air-fuel ratio of the exhaust gas leaner than the stoichiometric air-fuel ratio. That is, the air-fuel ratio control part 31 sets the target air-fuel ratio of the exhaust gas to leaner than the stoichiometric air-fuel ratio.

For example, the air-fuel ratio control part 31 performs fuel cut control in which the feed of fuel to the combustion chamber 5 of the internal combustion engine 50 is stopped to thereby make the air-fuel ratio of the exhaust gas leaner than the stoichiometric air-fuel ratio. If fuel cut control is performed, air is discharged from the engine body 1 to the exhaust passage and flows into the catalyst 24. For this reason, it is possible to effectively remove HC by the oxygen in the air without discharging NOx.

Note that, fuel cut control is performed when predetermined conditions are satisfied. The predetermined conditions are satisfied, for example, when the amount of depression of the accelerator pedal 42 is zero or substantially zero (that is, the engine load is zero or substantially zero) and the engine speed is equal to or more than a predetermined speed higher than the speed at the time of idling. When at step S106 the predetermined conditions are not satisfied, the air-fuel ratio control part 31 may reduce the amount of fuel with respect to the amount of intake air to thereby make the air-fuel ratio of the exhaust gas leaner than the stoichiometric air-fuel ratio. After step S106, the present control routine ends.

Second Embodiment

The exhaust purification system of an internal combustion engine and exhaust purification method in a second embodiment are basically the same as the exhaust purification system method of an internal combustion engine and exhaust purification in the first embodiment except for the points explained below. For this reason, below, the second embodiment of the present invention will be explained focusing on the parts different from the first embodiment.

Figure 6:
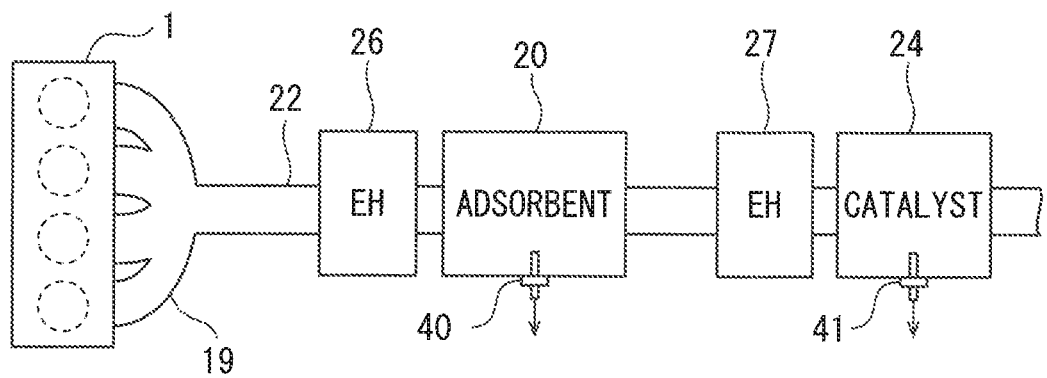
FIG. 6 is a view schematically showing an exhaust passage of an internal combustion engine in which an exhaust purification system of an internal combustion engine according to a second embodiment of the present invention is used.

FIG. 6 is a view schematically showing the exhaust passage of an internal combustion engine in which an exhaust purification system of an internal combustion engine according to the second embodiment of the present invention is used. In the second embodiment, the exhaust purification system is further provided with an adsorbent heating device 26 heating the adsorbent 20 and a catalyst heating device 27 heating the catalyst 24. The adsorbent heating device 26 is arranged in the exhaust passage at the upstream side from the adsorbent 20 in the direction of exhaust flow. The catalyst heating device 27 is arranged in the exhaust passage between the adsorbent 20 and the catalyst 24.

Note that, the adsorbent heating device 26 may be integral with the adsorbent 20. For example, the adsorbent heating device 26 and the adsorbent 20 may be housed in the same casing. Further, the catalyst heating device 27 may be integral with the catalyst 24. For example, the catalyst heating device 27 and the catalyst 24 may be housed in the same casing.

Further, at the adsorbent 20, the adsorbent temperature sensor 40 is arranged for detecting the temperature of the adsorbent 20. The adsorbent temperature sensor 40 is electrically connected to the ECU 30. The output of the adsorbent temperature sensor 40 is input to the ECU 30. Further, at the catalyst 24, a catalyst temperature sensor 41 is arranged for detecting the temperature of the catalyst 24. The catalyst temperature sensor 41 is electrically connected to the ECU 30. The output of the catalyst temperature sensor 41 is input to the ECU 30.

Note that, the adsorbent temperature sensor 40 may be arranged in the exhaust passage between the adsorbent heating device 26 and the adsorbent 20, and detect the temperature of the exhaust gas flowing into the adsorbent 20. Further, the catalyst temperature sensor 41 may be arranged in the exhaust passage between the catalyst heating device 27 and the catalyst 24, and detect the temperature of the exhaust gas flowing into the catalyst 24.

Figure 7:
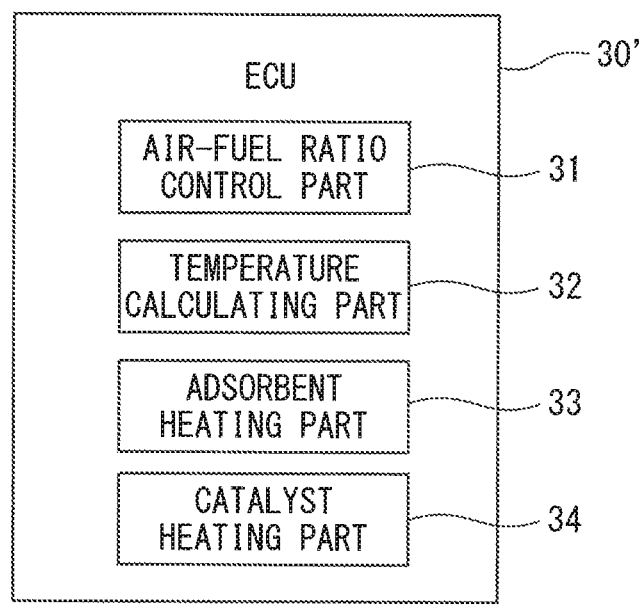
FIG. 7 is a view schematically showing the configuration of an ECU in the second embodiment of the present invention.

FIG. 7 is a view schematically showing the configuration of the ECU 30' in the second embodiment of the present invention. The exhaust purification system is further provided with an adsorbent heating part 33 controlling the adsorbent heating device 26, and a catalyst heating part 34 controlling the catalyst heating device 27. In the second embodiment, the ECU 30' functions as the air-fuel ratio control part 31, the temperature calculating part 32, the adsorbent heating part 33, and the catalyst heating part 34.

The adsorbent heating part 33 controls the adsorbent heating device 26 so that the temperature of the adsorbent 20 becomes the desired temperature. The adsorbent heating device 26 is for example an electric heater. In this case, the adsorbent heating part 33 controls the amount of current supplied to the adsorbent heating device 26. Note that, the adsorbent heating device 26 may be a burner. In this case, the adsorbent heating part 33 for example controls the amount air fed to the adsorbent heating device 26.

The catalyst heating part 34 controls the catalyst heating device 27 so that the temperature of the catalyst 24 becomes a desired temperature. The catalyst heating device 27 is for example an electric heater. In this case, the catalyst heating part 34 controls the amount of current supplied to the catalyst heating device 27. The temperature of the adsorbent 20 and the temperature of the catalyst 24 are controlled mutually independently. Note that, the catalyst heating device 27 may be a burner. In this case, the catalyst heating part 34 for example controls the amount of air fed to the catalyst heating device 27.

The adsorbent heating part 33 maintains the temperature of the adsorbent 20 in the vicinity of the desorption temperature of NOx by the adsorbent heating device 26 when the air-fuel ratio control part 31 performs NOx removal control. That is, the adsorbent heating part 33 maintains the temperature of the adsorbent 20 in the vicinity of the desorption temperature of NOx by the adsorbent heating device 26 when the air-fuel ratio control part 31 makes the air-fuel ratio the stoichiometric air-fuel ratio. By doing this, it is possible to make the NOx desorb from the adsorbent 20 and perform NOx removal control at a desired timing. Further, during performance of NOx removal control, it is possible to keep the temperature of the adsorbent 20 from deviating from the vicinity of the desorption temperature of NOx.

The adsorbent heating part 33 maintains the temperature of the adsorbent 20 in the vicinity of the desorption temperature of HC by the adsorbent heating device 26 when the air-fuel ratio control part 31 performs HC removal control. That is, the adsorbent heating part 33 uses the adsorbent heating device 26 to maintain the temperature of the adsorbent 20 in the vicinity of the desorption temperature of HC when the air-fuel ratio control part 31 makes the air-fuel ratio leaner than the stoichiometric air-fuel ratio. By doing this, it is possible to make HC desorb from the adsorbent 20 and perform HC removal control at a desired timing. Further, it is possible to keep time temperature of the adsorbent 20 from deviating from the vicinity of the desorption temperature of HC while HC removal control is being performed. This is particularly effective when low temperature air is fed to the adsorbent 20 such as during fuel cut control.

The catalyst heating part 34 maintains the temperature of the catalyst 24 at the activation temperature or more by the catalyst heating device 27 when the temperature of the adsorbent 20 is in the vicinity of the desorption temperature of NOx and when the temperature of the adsorbent 20 is in the vicinity of the desorption temperature of HC. By doing this, it is possible to keep the catalyst 24 from becoming deactivated and the exhaust purification performance of the catalyst 24 from falling during NOx removal control or HC removal control.

Air-Fuel Ratio Control

Figure 8A:
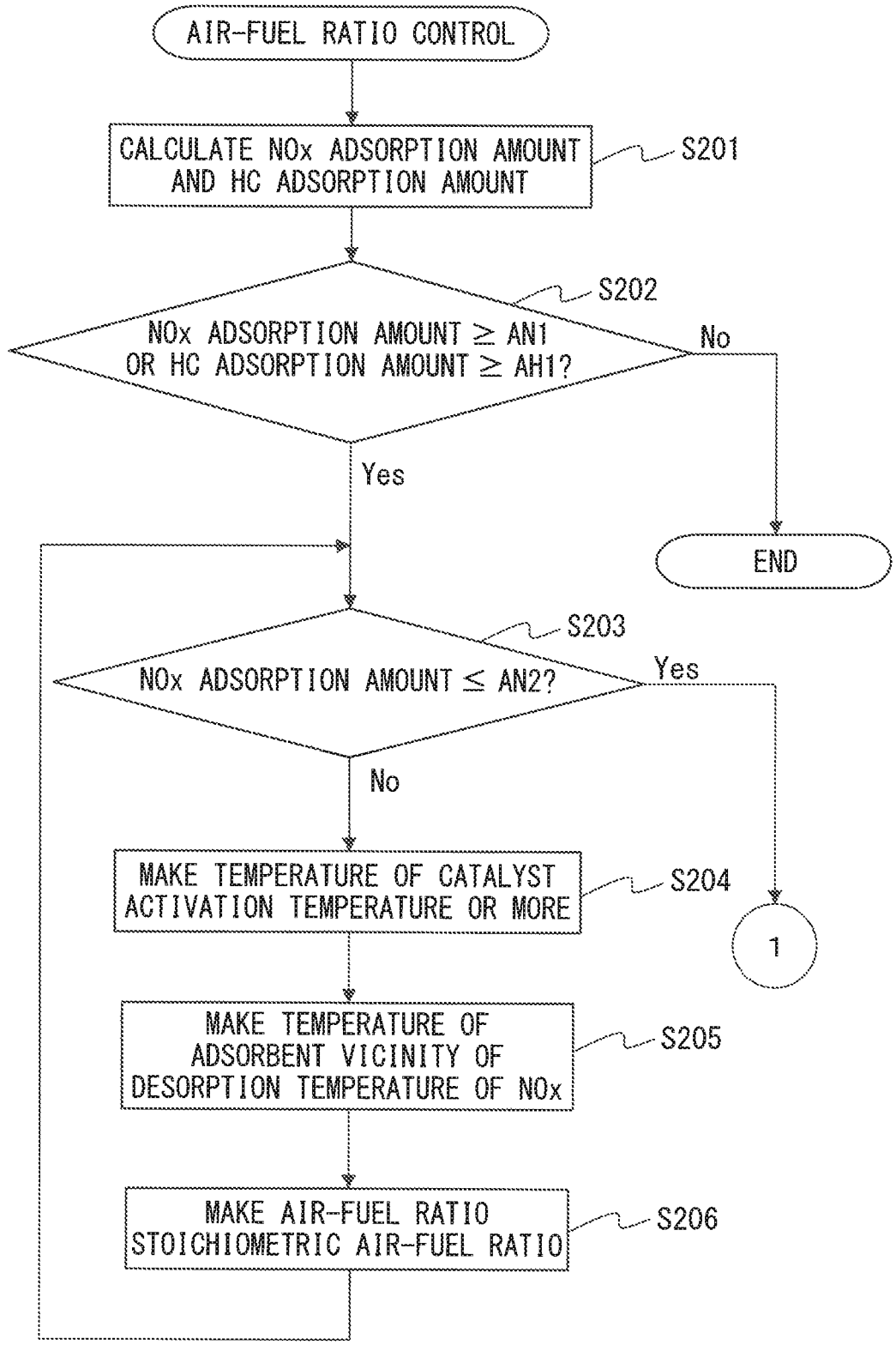
FIG. 8A is a flow chart showing a control routine of air-fuel ratio control in the second embodiment.
Figure 8B:
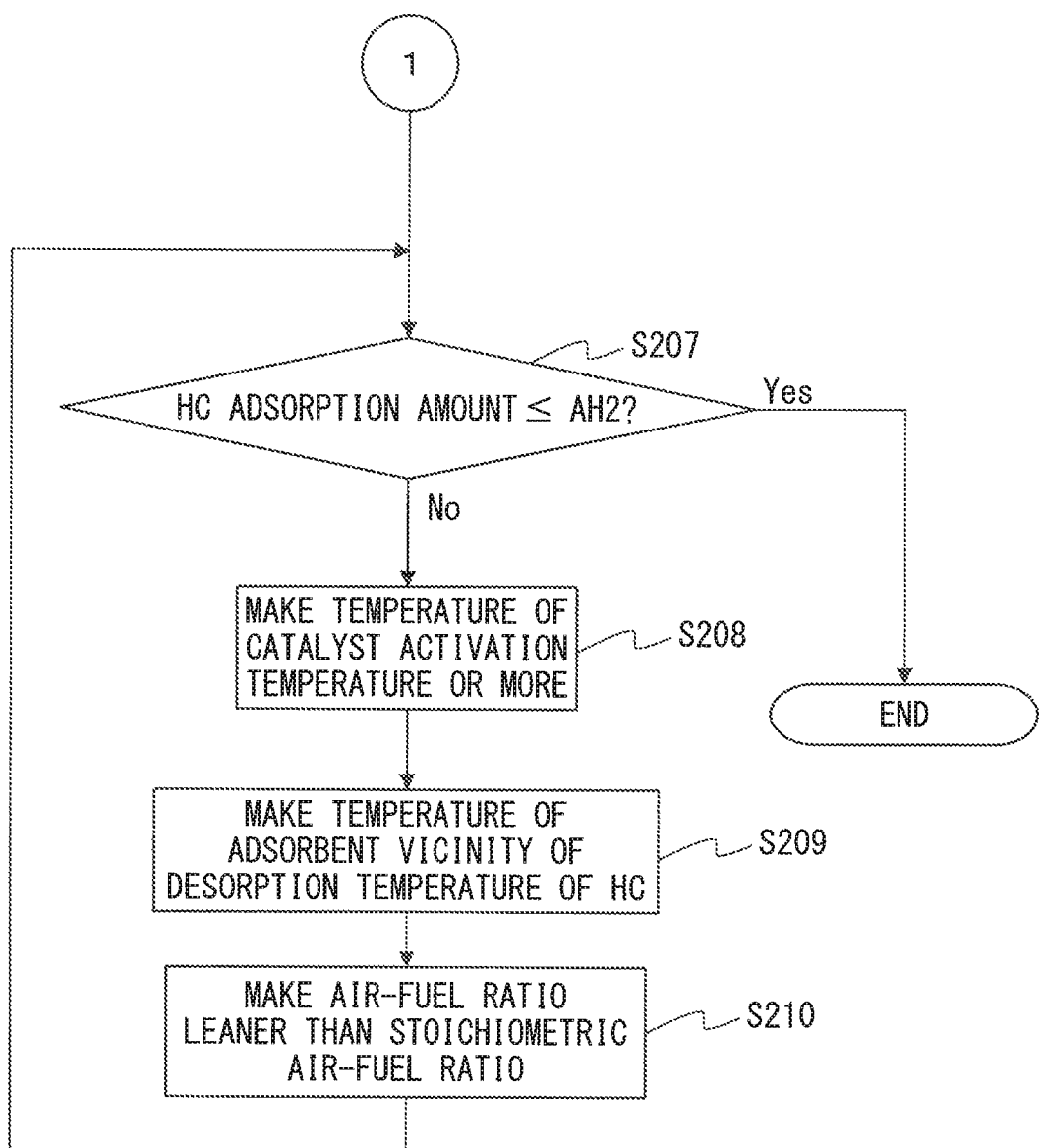
FIG. 8B is a flow chart showing a control routine of air-fuel ratio control in the second embodiment.

FIG. 8A and FIG. 8B are flow charts showing the control routine of air-fuel ratio control in the second embodiment. The present control routine is repeatedly performed by the ECU 30'.

First, at step S201, the air-fuel ratio control part 31 calculates the amount of adsorption of NOx at the adsorbent 20 and the amount of adsorption of HC at the adsorbent 20. For example, the air-fuel ratio control part 31, as shown in the following formula (2), calculates the amount of adsorption M by time integration of the adsorption speed $v_a$ minus the desorption speed $v_d$.

$$M = \int (v_a - v_d) dt \quad (2)$$

For example, the air-fuel ratio control part 31 calculates the adsorption speed $v_a$ by the following formula (3) and calculates the desorption speed $v_d$ by the following formula (4).

$$v_a = A_a \cdot \exp(-E_a/RT) \cdot P \cdot (1-\theta) \cdot \Phi \quad (3)$$

$$v_d = A_d \cdot \exp(-E_d(1-C \cdot \theta)/RT) \cdot \theta \cdot \Phi \quad (4)$$

Here, R is the gas constant, $A_a$ and $A_d$ are frequency factors, $E_a$ and $E_d$ are activation energies, $\Phi$ is the site density, and C is a correction coefficient. The frequency factors $A_a$, $A_d$, activation energies $E_a$, $E_d$, site density $\Phi$, and correction coefficient C are determined in advance for each of HC and NOx by experiments etc. Further, T is the temperature of the adsorbent 20 and is calculated by the temperature calculating part 32. Further, $\theta$ is the site adsorption rate (0 to 1) and for example is calculated by dividing the current amount of adsorption by the maximum amount of adsorption.

Further, P is the concentration of the adsorbed substance (NOx or HC) in the exhaust gas. It is calculated by a known method using an NOx concentration sensor, HC concentration sensor, air-fuel ratio sensor, calculation formula, or map. When the amount of adsorption of NOx is calculated, the concentration of NOx in the exhaust gas is entered for P of the above formula (3) so as to calculate the adsorption speed of NOx. On the other hand, when the amount of adsorption of HC is calculated, the concentration of HC in the exhaust gas is entered for P of the above formula (3) so as to calculate the adsorption speed of HC.

Note that, the air-fuel ratio control part 31 may use a map prepared in advance so as to calculate the adsorption speed $v_a$ based on the temperature T of the adsorbent, the site adsorption rate $\theta$, and the concentration P of the adsorbed substance in the exhaust gas. Similarly, the air-fuel ratio control part 31 may use a map prepared in advance so as to calculate the desorption speed $v_d$ based on the temperature T of the adsorbent and the site adsorption rate $\theta$.

Next, at step S202, the air-fuel ratio control part 31 judges whether the amount of adsorption of NOx is equal to or more than a first NOx reference amount AN1 or if the amount of adsorption of HC is equal to or more than a first HC reference amount AH1. The first NOx reference amount AN1 is predetermined and is set to a value less than the maximum amount of adsorption of NOx in the adsorbent 20. The first HC reference amount AH1 is predetermined and is set to a value less than the maximum amount of adsorption of HC in the adsorbent 20.

If at step S202 it is judged that the amount of adsorption of NOx is less than the first NOx reference amount AN1 and the amount of adsorption of HC is less than the first HC reference amount AH1, the present control routine ends. On the other hand, if at step S202 it is judged that the amount of adsorption of NOx is equal to or more than the first NOx reference amount AN1 or the amount of adsorption of HC is equal to or more than the first HC reference amount AH1, the present control routine proceeds to step S203.

At step S203, the air-fuel ratio control part 31 judges whether the amount of adsorption of NOx is equal to or less than a second NOx reference amount AN2. The second NOx reference amount AN2 is predetermined and is set to a value less than the first NOx reference amount AN1. If at step S203 it is judged that the amount of adsorption of NOx is greater than the second NOx reference amount AN2, the present control routine proceeds to step S204.

At step S204, the catalyst heating par 34 controls the catalyst heating device 27 to make the temperature of the catalyst 24 the activation temperature or more. The activation temperature is predetermined. Specifically, the catalyst heating part 34 controls the catalyst heating device 27 by feedback so that the temperature of the catalyst 24 detected by the catalyst temperature sensor 41 becomes equal to or more titan the activation temperature. Note that, the catalyst heating part 34 may calculate the temperature of the catalyst 24 based on the operating state of the internal combustion engine 50 (the amount of intake air etc.), the amount of current supplied to the catalyst heating device 27, etc., and control the catalyst heating device 27 by feedback so that the calculated temperature of the catalyst 24 becomes equal to or more than the activation temperature. In this case, the catalyst temperature sensor 41 may be omitted.

Next, at step S205, the adsorbent heating part 33 controls the adsorbent heating device 26 to make the temperature of the adsorbent 20 the vicinity of the desorption temperature of NOx. Specifically, the adsorbent heating part 33 controls the adsorbent heating device 26 by feedback so that the temperature of the adsorbent 20 calculated by the temperature calculating part 32 becomes the vicinity of the desorption temperature of NOx. Note that, the temperature calculating part 32 may calculate the temperature of five adsorbent 20 based on the operating stale of the internal combustion engine 50 (amount of intake air etc.), amount of current supplied to the adsorbent 20, etc. In this case, the adsorbent temperature sensor 40 may be omitted.

Next, at step S206, the air-fuel ratio control part 31 performs NOx removal control. Specifically, the air-fuel ratio control part 31 makes the air-fuel ratio of the exhaust gas the stoichiometric air-fuel ratio.

The present control routine returns to step S203 after step S206. After that, until the amount of adsorption of NOx falls and reaches the second NOx reference amount AN2, step S203 to step S206 are repeatedly executed. Note that, the amount of adsorption of NOx is updated by the above formula (2).

If at step S203 it is judged that the amount of adsorption of NOx is equal to or less than the second NOx reference amount AN2, the present control routine proceeds to step S207. At step S207, the air-fuel ratio control part 31 judges whether the amount of adsorption of HC is equal to or less than a second HC reference amount AH2. The second HC reference amount AH2 is predetermined and is set to a value less than the first HC reference amount AH1. If at step S207 it is judged that the amount of adsorption of HC is greater than the second HC reference amount AH2, the present control routine proceeds to step S208.

At step S208, in the same way as step S204, the catalyst heating part 34 controls the catalyst heating device 27 to make the temperature of the catalyst 24 the activation temperature or more. Next, at step S209, the adsorbent heating part 33 controls the adsorbent heating device 26 to make the temperature of the adsorbent 20 the vicinity of the desorption temperature of HC. Specifically, the adsorbent heating part 33 controls the adsorbent beating device 26 by feedback so that the temperature of the adsorbent 20 calculated by the temperature calculating part 32 becomes the vicinity of the desorption temperature of HC.

Next, at step S210, the air-fuel ratio control part 31 performs HC removal control. Specifically, the air-fuel ratio control part 31 makes the air-fuel ratio of the exhaust gas leaner than the stoichiometric air-fuel ratio. For example, the air-fuel ratio control part 31 performs fuel cut control in which the feed of fuel to the combustion chamber 5 of the internal combustion engine 50 is stopped to thereby make the air-fuel ratio leaner than the stoichiometric air-fuel ratio.

The present control routine returns to step S207 after step S210. After that, until the amount of adsorption of HC falls and reaches the second HC reference amount AH2, step S207 to step S210 are repeatedly performed. Note that, the amount of adsorption of HC is updated by the above formula (2). If at step S207 it is judged that the amount of adsorption of HC is equal to or less than the second HC reference amount AH2, the present control routine ends.

In the present control routine, the air-fuel ratio control part 31 performs the NOx removal control and HC removal control if the amount of adsorption of NOx at the adsorbent 20 is equal to or more than the first NOx reference amount AN1 or the amount of adsorption of HC at adsorbent 20 is equal to or more than the first HC reference amount AH1. By doing this, it is possible to keep the adsorbent 20 from becoming saturated by the NOx or HC while decreasing the power consumption for control of the adsorbent heating device 26 etc.

Third Embodiment

The exhaust purification system and exhaust purification method of an internal combustion engine in a third embodiment are basically the same as the exhaust purification system and exhaust purification method of an internal combustion engine in the second embodiment except for the points explained below. For this reason, below, the third embodiment of the present invention will be explained focusing on the parts different from the second embodiment.

Figure 9:
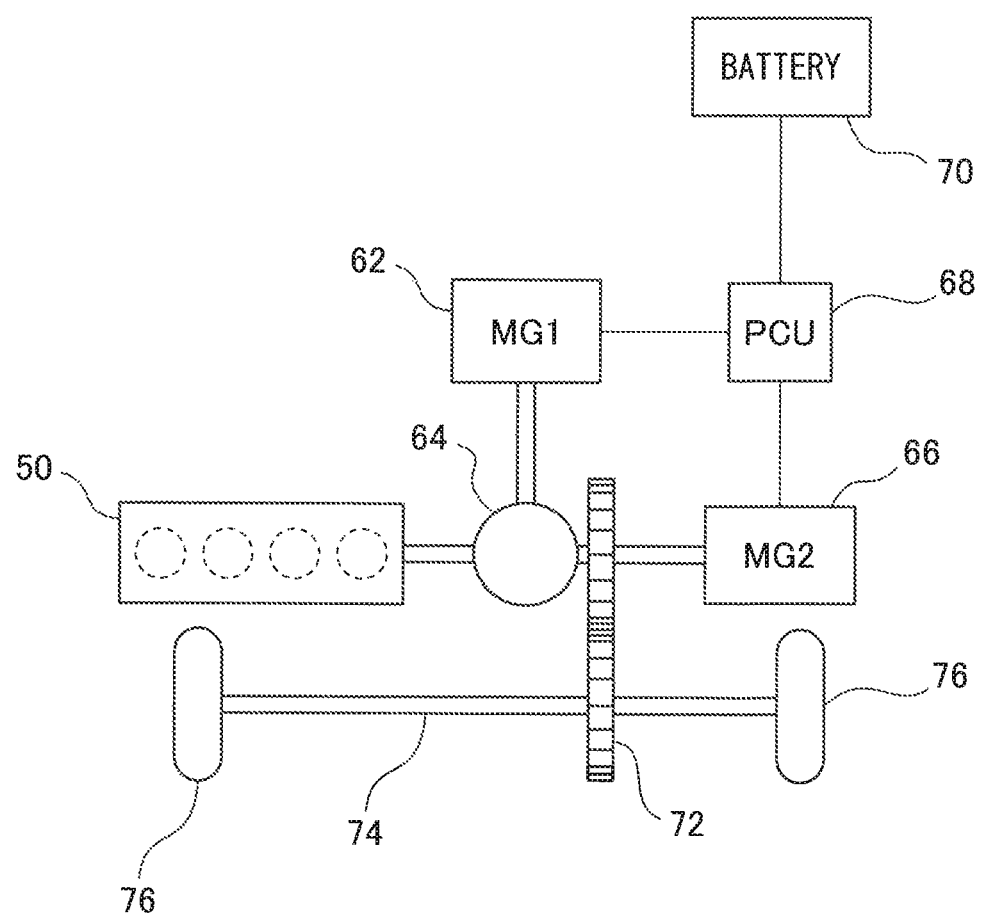
FIG. 9 is a view schematically showing the configuration of a vehicle in which an exhaust purification system of an internal combustion engine according to a third embodiment of the present invention is used.

FIG. 9 is a view schematically showing the configuration of a vehicle in which a control device of an internal combustion engine according to a third embodiment of the present invention is used. The vehicle is provided with an internal combustion engine 50, a first motor-generator 62, a power dividing mechanism 64, a second motor-generator 66, a power control unit (PCU) 68, and a battery 70.

In the vehicle, driving use power is output by the internal combustion engine 50 and the second motor-generator 66. That is, in the third embodiment, the vehicle in which the internal combustion engine 50 is provided is a hybrid vehicle. The configuration of a hybrid vehicle is known, so below the functions of the parts will be just briefly explained.

The output shall (crank shaft) of the internal combustion engine 50 is mechanically connected to the power dividing mechanism 64. The output of the internal combustion engine 50 is input to the power dividing mechanism 64. When the first motor-generator 62 functions as a generator, the output of the internal combustion engine 50 is divided between the first motor-generator 62 and a speed reducer 72 through the power dividing mechanism 64. The output of the internal combustion engine 50 distributed to the first motor-generator 62 is used by the first motor-generator 62 to generate electric power. On the other hand, the output of the internal combustion engine 50 distributed to the speed reducer 72 is transmitted as driving use power through the axle 74 to the wheels 76.

The first motor-generator 62 is mechanically connected through the power dividing mechanism 64 to the output shaft (crank shaft) of the internal combustion engine 50. When the first motor-generator 62 functions as a motor, the electric power stored in the battery 70 is supplied through the PCU 68 to the first motor-generator 62. The output of the first motor-generator 62 is supplied through the power dividing mechanism 64 to the output shaft of the internal combustion engine 50. As a result, the crank shaft turns without the air-fuel mixture being burned in the combustion chamber 5 and so-called "motoring" is performed. Therefore, the first motor-generator 62 can start the operation of the internal combustion engine 50.

When the second motor-generator 66 functions as a motor, the electric power stored in the battery 70 or the electric power generated by the first motor-generator 62 is supplied through the PCU 68 to the second motor-generator 66, and the output of the second motor-generator 66 is supplied to the speed reducer 72. The output of the second motor-generator 66 supplied to the speed reducer is transmitted as driving use power through tire axle 74 to the wheels 76.

On the other hand, at tire time of deceleration of the vehicle, the second motor-generator 66 is driven by the rotation of the wheels 76, so the second motor-generator 66 functions as a generator. The recovered electric power generated by the second motor-generator 66 is input through the PCU 68 and supplied to the battery 70.

Figure 10:
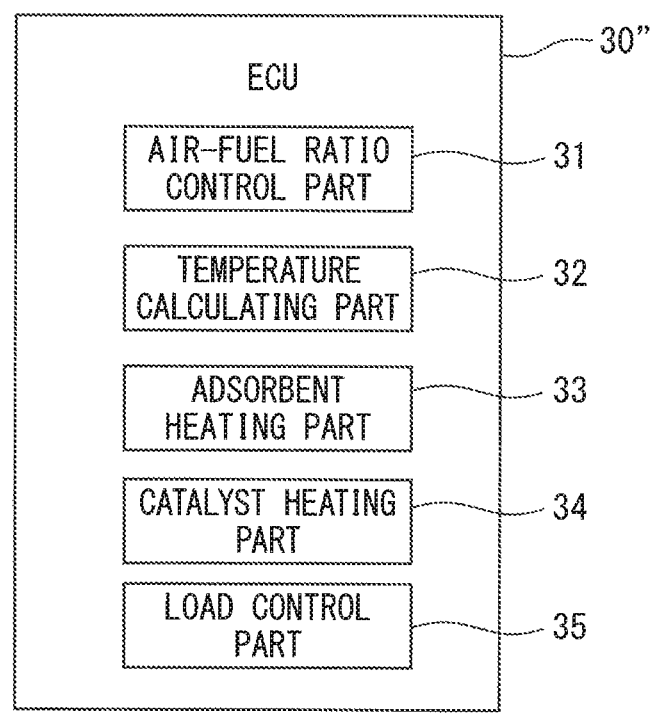
FIG. 10 is a view schematically showing the configuration of an ECU in the third embodiment of the present invention.

FIG. 10 is a view schematically showing the configuration of an ECU 30" in the third embodiment of the present invention. The exhaust purification system is further provided with the first motor-generator 62 and a load control part 35. In the third embodiment, the ECU30" functions as the air-fuel ratio control part 31, the temperature calculating part 32, the adsorbent heating pan 33, the catalyst heating part 34, and the load control part 35.

In the third embodiment, in HC removal control, the air-fuel ratio control part 31 uses the first motor-generator 62 to start operation of the internal combustion engine 50 and thereby make the air-fuel ratio of the exhaust gas leaner than the stoichiometric air-fuel ratio. If the first motor-generator 62 is used to start operation of the internal combustion engine 50 as "motoring", air is fed into the exhaust passage. For this reason, it is possible to effectively remove HC by the oxygen in the air without discharging NOx. Further, driving use power is output by the second motor-generator 66, so even while the vehicle is being driven, motoring can be used to effectively remove the HC. Furthermore, even when the vehicle is stopped, motoring can be used to effectively remove HC.

The load control part 35 controls the load (engine load) of the internal combustion engine 50. For example, the load control pan 35 changes the opening degree of the throttle valve 18 to control the amount of intake air and thereby control the engine load. If the engine load is high, the temperature of the exhaust gas rises and the temperature of the adsorbent 20 rises. As a result, in NOx removal control, the temperature of the adsorbent 20 is liable to become higher than the vicinity of the desorption temperature of NOx. Further, driving use power is output by the second motor-generator 66, so it is possible to control the engine load regardless of the demanded load of the vehicle.

Therefore, in the third embodiment, the load control part 35 controls the load so that the temperature of the adsorbent 20 is maintained in the vicinity of the desorption temperature of NOx when the air-fuel ratio control part 31 makes the air-fuel ratio of the exhaust gas the stoichiometric air-fuel ratio in NOx removal control. By doing this, it is possible to precisely control the desorption of NOx and in turn effectively remove the NOx.

Air-Fuel Ratio Control

In the third embodiment as well, in the same way as the second embodiment, the control routine of air-fuel ratio control of FIG. 8A and FIG. 8B is performed. In the third embodiment, at step S205, the load control part 35 controls the engine load so that the temperature of the adsorbent 20 is maintained in the vicinity of the desorption temperature of NOx. Specifically, the load control part 35 controls the engine load by feedback so that the temperature of the adsorbent 20 calculated by the temperature calculating part 32 becomes the vicinity of the desorption temperature of NOx.

Note that, at step S205, the load control part 35 may control the engine load and the adsorbent heating part 33 may control the adsorbent healing device 26 so that the temperature of the adsorbent 20 is maintained in the vicinity of the desorption temperature of NOx.

Further, at step S210, the air-fuel ratio control part 31 uses the first motor-generator 62 to start the operation of the internal combustion engine 50 and thereby make the air-fuel ratio of the exhaust gas leaner than the stoichiometric air-fuel ratio. Note that, when predetermined conditions are satisfied, it is also possible to make the air-fuel ratio of the exhaust gas leaner than the stoichiometric air-fuel ratio by the fuel cut control using the rotational force of the axle 74 without using the first motor generator 62. By doing this, it is possible to keep down the consumption of electric power by the motoring.

Note that, the first motor-generator 62 may be a motor which docs not function as a generator. Further, the second motor-generator 66 may be a motor which does not function as a generator. Further, the vehicle in which the exhaust purification system of an internal combustion engine is used may be a plug-in hybrid vehicle which can use an external power source to charge the battery 70.

The vehicle shown in FIG. 9 is a so-called series parallel type hybrid vehicle. However, the vehicle in which the exhaust purification system of an internal combustion engine is used may be a so-called series type, parallel type, or other type of hybrid vehicle.

Fourth Embodiment

The exhaust purification system of an internal combustion engine and exhaust purification method in a fourth embodiment are basically the same as the exhaust purification system of an internal combustion engine and exhaust purification method in the first embodiment except for the points explained below. For this reason, below, the fourth embodiment of the present invention will be explained focusing on the parts different from the first embodiment.

In the fourth embodiment, at the adsorbent 20, the desorption temperature of NOx is higher than the desorption temperature of HC. In other words, the adsorbent 20 is configured so that the desorption temperature of NOx becomes higher than the desorption temperature of HC.

For this reason, when the internal combustion engine 50 is warmed up and the temperature of tire exhaust gas rises, HC is desorbed from the adsorbent 20 in advance of the NOx, then NOx is desorbed from the adsorbent 20. NOx and HC differ in suitable removal conditions, so it is desirable to remove HC before NOx is desorbed and then remove the NOx.

Therefore, in the present embodiment, the air-fuel ratio control part 31 makes the air-fuel ratio leaner than the stoichiometric air-fuel ratio when the temperature of the adsorbent 20 is in the vicinity of the desorption temperature of HC, then makes the air-fuel ratio the stoichiometric air-fuel ratio when the temperature of the adsorbent 20 reaches the vicinity of the desorption temperature of NOx.

By this, the HC and NOx desorbed from the adsorbent 20 are effectively removed at suitable timings, so it is possible to keep the exhaust emissions from deteriorating when HC and NOx flow out from the adsorbent 20.

Explanation of Control Using Time Chart

Figure 11:
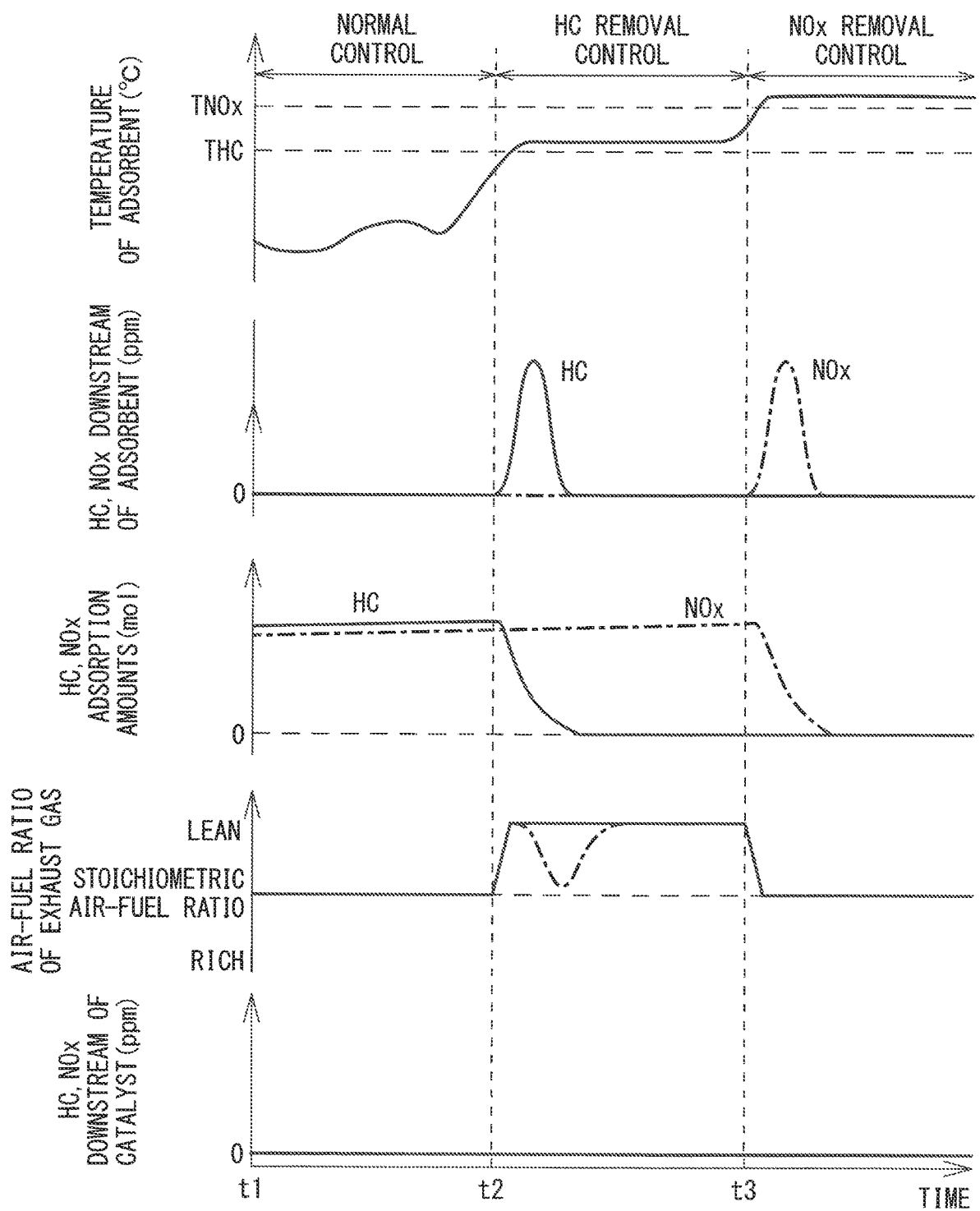
FIG. 11 is a time chart of the HC and NOx concentrations etc., in exhaust gas downstream of a catalyst when control in a fourth embodiment is performed.

Below, referring to FIG. 11, the control in the fourth embodiment for removing HC and NOx desorbed from the adsorbent 20 will be specifically explained. FIG. 11 is a time chart of the HC and NOx concentrations in the exhaust gas downstream of the catalyst, the air-fuel ratio of the exhaust gas, the amounts of adsorption of HC and NOx at the adsorbent, the HC and NOx concentrations in the exhaust gas downstream of the adsorbent, and the temperature of the adsorbent when control in the fourth embodiment is performed.

In the graphs of the HC and NOx concentrations in the exhaust gas downstream of the catalyst 24, the HC concentration is shown by the solid line, while the NOx concentration is shown by the one-dot chain line. In the graph of the air-fuel ratio of the exhaust gas, the engine exhaust air-fuel ratio is shown by the solid line, while the catalyst air-fuel ratio is shown by the one-dot chain line. In the graph of the amounts of adsorption of NOx and HC at the adsorbent 20, the amount of adsorption of HC is shown by the solid line, while the amount of adsorption of NOx is shown by the one-dot chain line. In the graph of the HC and NOx concentrations in the exhaust gas downstream of the adsorbent 20, the HC concentration is shown by the solid line while the NOx concentration is shown by the one-dot chain line.

In the illustrated example, at the time t1, predetermined values or more of NOx and HC are adsorbed at the adsorbent 20. Further, at the time t1, the temperature of the adsorbent 20 is less than the desorption temperature THC of HC, and NOx and HC are not desorbed from the adsorbent 20.

In the example of FIG. 11, in normal control where the HC and NOx desorbed from the adsorbent 20 are not removed, the target air-fuel ratio of the exhaust gas is set to the stoichiometric air-fuel ratio. For this reason, at the time t1, the engine exhaust air-fuel ratio and catalyst air-fuel ratio are maintained at the stoichiometric air-fuel ratio.

After the time t1, the temperature of the adsorbent 20 gradually rises and at the time t2 reaches the vicinity of the desorption temperature THC of HC. For this reason, at the time t2, the target air-fuel ratio of the exhaust gas is set to leaner than the stoichiometric air-fuel ratio and then HC removal control is started.

After the time t2, due to the desorption of HC from the adsorbent 20, the HC concentration in the exhaust gas downstream of the adsorbent 20 becomes higher and the amount of adsorption of HC at the adsorbent 20 gradually decreases. At this time, the engine exhaust air-fuel ratio and catalyst air-fuel ratio are maintained leaner than the stoichiometric air-fuel ratio and the HC desorbed from the adsorbent 20 reacts with the oxygen in the exhaust gas. For this reason, HC is removed at the catalyst 24 and does not flow out from the catalyst 24 much at all.

In the example of FIG. 11, after the time t2, at the time t3, the temperature of the adsorbent 20 reaches the vicinity of the desorption temperature TNOx of NOx. For this reason, at the time t3, the target air-fuel ratio of the exhaust gas is set to the stoichiometric air-fuel ratio and NOx removal control is started.

After the time t3, due to the desorption of NOx from the adsorbent 20, the NOx concentration in the exhaust gas downstream of the adsorbent 20 becomes higher and the amount of adsorption of NOx at the adsorbent 20 is gradually decreased. At this time, the engine exhaust air-fuel ratio and catalyst air-fuel ratio are maintained at the stoichiometric air-fuel ratio, so NOx is removed at the catalyst 24 and does not flow out much at all from the catalyst 24.

Note that, in the example of FIG. 11, the HC removal control and NOx removal control are performed consecutively, but normal control may be performed between the HC removal control and the NOx removal control.

Figure 12:
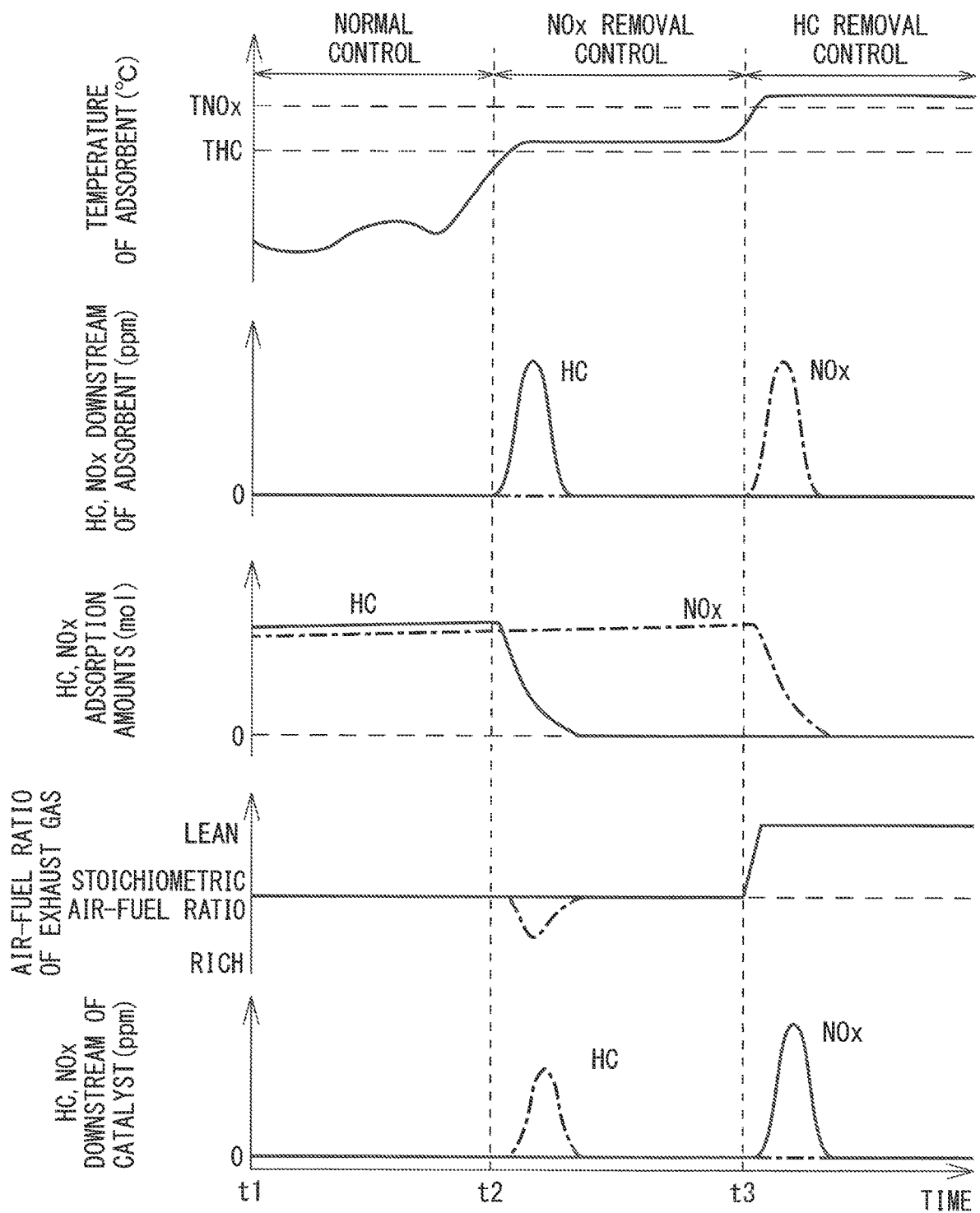
FIG. 12 is a time chart of the HC and NOx concentrations etc., in exhaust gas downstream of a catalyst when control in a comparative example is performed.

FIG. 12 is a time chart similar to FIG. 11 when control in a comparative example is performed. In the comparative example, the order of the HC removal control and the NOx removal control is reverse from that of the present embodiment. That is, NOx removal control is performed when the temperature of the adsorbent 20 is in the vicinity of the desorption temperature THC of HC, while HC removal control is performed when the temperature of live adsorbent 20 is in the vicinity of the desorption temperature TNOx of NOx.

For this reason, after the time t2, the target air-fuel ratio of the exhaust gas is set to the stoichiometric air-fuel ratio and the engine exhaust air-fuel ratio is maintained at the stoichiometric air-fuel ratio. On the other hand, due to the effect of the HC desorbed from the adsorbent 20, the catalyst air-fuel ratio becomes richer than the stoichiometric air-fuel ratio. As a result, the performance of the catalyst 24 in removing HC falls and a part of the HC desorbed from the adsorbent 20 flows out from the catalyst 24 without being removed at the catalyst 24.

Further, after the time t3, the target air-fuel ratio of the exhaust gas is set to leaner than the stoichiometric air-fuel ratio and the engine exhaust air-fuel ratio and catalyst air-fuel ratio are maintained leaner than the stoichiometric air-fuel ratio. As a result, the NOx desorbed from the adsorbent 20 is not removed at the catalyst 24 and flows out from the catalyst 24.

Therefore, in the present embodiment if the desorption temperature TNOx of NOx is higher than the desorption temperature THC of HC, it is possible to perform HC removal control and NOx removal control at suitable timings to decrease the amounts of outflow of NOx and HC compared with the comparative example.

Air-Fuel Ratio Control

FIG. 13 is a flow chart showing the control routine of air-fuel ratio control in the fourth embodiment. The present control routine is repeatedly performed by the ECU 30 at predetermined intervals.

The present control routine is performed in the same way as the control routine of the air-fuel ratio control of FIG. 5, except that the order of the HC removal control and the NOx removal control is reversed. That is, step S301 corresponds to step S101, step S302 and step S305 correspond to step S103 and step S106, step S303 and step S306 correspond to step S102 and step S105, and step S304 corresponds to step S104.

OTHER EMBODIMENTS

Above, preferred embodiments according to the present invention were explained, but the present invention is not limited to these embodiments and can be corrected and changed in various ways within the language of the claims. For example, as long as NOx is effectively removed when the air-fuel ratio of the exhaust gas is the stoichiometric air-fuel ratio and HC is effectively removed when the air-fuel ratio of the exhaust gas is leaner than the stoichiometric air-fuel ratio, the catalyst 24 may be a catalyst other than a three-way catalyst. For example, the catalyst 24 may be a combination of an oxidation catalyst and NOx storage-reduction catalyst (NSR catalyst).

Further, the internal combustion engine 50 may be a diesel engine. Further, the adsorbent 20 may be integral with the catalyst 24. For example, the adsorbent 20 and the catalyst 24 may be housed in the same casing.

Further, the above-mentioned embodiments can be worked combined in any way. For example, the vehicles in which the exhaust purification systems of an internal combustion engine according to the first embodiment and the fourth embodiment are used may be hybrid vehicles. In this case, at step S106 of FIG. 5, the air-fuel ratio control part 31 may use the first motor-generator 62 to start the operation of the interval combustion engine 50 and thereby make the air-fuel ratio of the exhaust gas leaner than the stoichiometric air-fuel ratio.

Further, an adsorbent 20 with a desorption temperature of NOx higher than the desorption temperature of HC may be used in the second embodiment and the third embodiment. In this case, the HC removal control is performed before the NOx removal control. That is, step S207 to step S210 of FIG. 8B are performed before step S203 to step S206 of FIG. 8A.

Further, the air-fuel ratio control part 31 may use an air feed device feeding air to the exhaust passage to control the air-fuel ratio of the exhaust gas.

REFERENCE SIGNS LIST

20. adsorbent
24. catalyst
30. ECU
31. air-fuel ratio control part
32. temperature calculating part

The invention claimed is:

1. An exhaust purification system of an internal combustion engine comprising
    an adsorbent arranged in an exhaust passage of an internal combustion engine and adsorbing HC and NOx in exhaust gas,
    a catalyst arranged in the exhaust passage at a downstream side from the adsorbent in a direction of exhaust flow and removing HC and NOx,
    an air-fuel ratio control part configured to control an air-fuel ratio of exhaust gas discharged from an engine body of the internal combustion engine to the exhaust passage, and
    a temperature calculating part configured to calculate a temperature of the adsorbent, wherein
    at the adsorbent, a desorption temperature of HC is higher than a desorption temperature of NOx, and
    the air-fuel ratio control part is configured to make the air-fuel ratio a stoichiometric air-fuel ratio when a temperature of the adsorbent is in the vicinity of the desorption temperature of NOx, then make the air-fuel ratio leaner than the stoichiometric air-fuel ratio when the temperature of the adsorbent reaches the vicinity of the desorption temperature of HC.

2. The exhaust purification system of an internal combustion engine according to claim 1, wherein the air-fuel ratio control part is configured to make the air-fuel ratio leaner than the stoichiometric air-fuel ratio by performing fuel cut control in which feed of fuel to a combustion chamber of the internal combustion engine is stopped.

3. The exhaust purification system of an internal combustion engine according to claim 1, wherein
    a vehicle in which the internal combustion engine is provided is a hybrid vehicle,
    the exhaust purification system of an internal combustion engine further comprises a motor able to start operation of the internal combustion engine, and
    the air-fuel ratio control part is configured to make the air-fuel ratio leaner than the stoichiometric air-fuel ratio by using the motor to start operation of the internal combustion engine.

4. The exhaust purification system of an internal combustion engine according to claim 1, further comprising
    an adsorbent heating device heating the adsorbent and
    an adsorbent heating part configured to control the adsorbent healing device, wherein
    the adsorbent heating part is configured to maintain the temperature of the adsorbent in a vicinity of the desorption temperature of HC by the adsorbent heating device when the air-fuel ratio control part makes the air-fuel ratio leaner than the stoichiometric air-fuel ratio.

5. The exhaust purification system of an internal combustion engine according to claim 1, wherein
    a vehicle in which the internal combustion engine is provided is a hybrid vehicle,
    the exhaust purification system of an internal combustion engine further comprises a load control pan configured to control a load of the internal combustion engine, and
    the load control part is configured to control the load so that the temperature of the adsorbent is maintained in the vicinity of the desorption temperature of NOx when the air-fuel ratio control part makes the air-fuel ratio the stoichiometric air-fuel ratio.

6. The exhaust purification system of an internal combustion engine according to claim 1, further comprising
    an adsorbent heating device heating the adsorbent and
    an adsorbent beating part configured to control the adsorbent heating device, wherein
    the adsorbent heating part is configured to maintain the temperature of the adsorbent in the vicinity of the desorption temperature of NOx by the adsorbent heating device when the air-fuel ratio control part makes the air-fuel ratio the stoichiometric air-fuel ratio.

7. The exhaust purification system of an internal combustion engine according to claim 1, further comprising
    a catalyst heating device heating the catalyst and
    a catalyst heating part configured to control the catalyst heating device, wherein
    the catalyst healing part is configured to maintain a temperature of the catalyst at an activation temperature or more by the catalyst heating device when the temperature of the adsorbent is in the vicinity of the desorption temperature of NOx and when the temperature of the adsorbent is in the vicinity of the desorption temperature of HC.

8. An exhaust purification method using an adsorbent arranged in an exhaust passage of an internal combustion engine and adsorbing HC and NOx in exhaust gas, and a catalyst arranged in the exhaust passage at a downstream side from the adsorbent in a direction of exhaust flow and removing HC and NOx, comprising
    making an air-fuel ratio of exhaust gas discharged from an engine body of the internal combustion engine to the exhaust passage a stoichiometric air-fuel ratio when a temperature of the adsorbent is the vicinity of a desorption temperature of NOx, and making the air-fuel ratio leaner than the stoichiometric air-fuel ratio when the temperature of the adsorbent reaches the vicinity of a desorption temperature of HC, wherein at the adsorbent, the desorption temperature of HC is higher than the desorption temperature of NOx.

9. An exhaust purification system of an internal combustion engine comprising an adsorbent arranged in an exhaust passage of an internal combustion engine and adsorbing HC and NOx in exhaust gas, a catalyst arranged in the exhaust passage at a downstream side from the adsorbent in a direction of exhaust flow and removing HC and NOx, and an electronic control unit, wherein the electronic control unit is configured to control an air-fuel ratio of exhaust gas discharged from an engine body of the internal combustion engine to the exhaust passage, and calculate a temperature of the adsorbent, at the adsorbent, a desorption temperature of HC is higher than a desorption temperature of NOx, and the electronic control unit is configured to make the air-fuel ratio a stoichiometric air-fuel ratio when a temperature of the adsorbent is in the vicinity of the desorption temperature of NOx, then make the air-fuel ratio leaner than the stoichiometric air-fuel ratio when the temperature of the adsorbent reaches the vicinity of the desorption temperature of HC.

\* \* \* \* \*